(12) United States Patent
Takahashi et al.

(10) Patent No.: US 10,458,328 B2
(45) Date of Patent: Oct. 29, 2019

(54) WELDED COMBUSTION PRESSURE SENSOR AND METHOD OF MANUFACTURING SAME

(71) Applicants: CITIZEN FINEDEVICE CO., LTD., Minamitsuru-gun, Yamanashi (JP); CITIZEN HOLDINGS CO., LTD., Nishitokyo-shi, Tokyo (JP)

(72) Inventors: Kazuo Takahashi, Yamanashi (JP); Yoshihiko Soga, Yamanashi (JP)

(73) Assignees: CITIZEN FINEDEVICE CO., LTD., Minamitsuru-Gunm Yamanashi (JP); CITIZEN WATCH CO., LTD., Nishitokyo-Shi, Tokyo (JP)

( * ) Notice: Subject to any disclaimer, the term of this patent is extended or adjusted under 35 U.S.C. 154(b) by 132 days.

(21) Appl. No.: 15/129,598

(22) PCT Filed: Mar. 25, 2015

(86) PCT No.: PCT/JP2015/059137
§ 371 (c)(1),
(2) Date: Sep. 27, 2016

(87) PCT Pub. No.: WO2015/147061
PCT Pub. Date: Oct. 1, 2015

(65) Prior Publication Data
US 2017/0130650 A1  May 11, 2017

(30) Foreign Application Priority Data

Mar. 27, 2014  (JP) ................................ 2014-067066

(51) Int. Cl.
*F02B 77/08* (2006.01)
*G01L 23/10* (2006.01)
(Continued)

(52) U.S. Cl.
CPC ............ *F02B 77/085* (2013.01); *B23K 26/24* (2013.01); *G01L 9/08* (2013.01); *G01L 19/0645* (2013.01);
(Continued)

(58) Field of Classification Search
CPC ......... G01L 23/10; G01L 23/222; G01L 9/08; G01L 19/0645; G01L 19/0046;
(Continued)

(56) References Cited

U.S. PATENT DOCUMENTS 6,050,145 A * 4/2000 Olson ................. G01L 19/0084
73/706
2005/0189428 A1* 9/2005 Vogler ................ G01L 19/0038
236/12.1

(Continued)

FOREIGN PATENT DOCUMENTS

JP  62-168685 A   7/1987
JP  2006-308223 A  11/2006
(Continued)

OTHER PUBLICATIONS

Translation of JP2010096656.*
(Continued)

*Primary Examiner* — Justin Seo
*Assistant Examiner* — David L Singer
(74) *Attorney, Agent, or Firm* — Birch, Stewart, Kolasch & Birch, LLP

(57) ABSTRACT

A combustion pressure sensor has a case member with a joint surface on the side of a tip end and in which an opening portion is provided. A joint surface of a pressure reception member on which a combustion pressure acts is brought into planar contact with the joint surface of the case member so as to block the opening portion. A welding portion joins the joint surfaces to each other. A piezoelectric element stored in (Continued)

the case member converts a pressing force based on the combustion pressure transmitted from the pressure reception member into a signal. On the side of one edge side in at least the one joint surface, the one joint surface is limited to a given depth of welding from the other edge side. A predetermined clearance portion is provided so as to form a predetermined gap with the opposite joint surface and a welding portion is provided which includes at least all the limited joint surface from the other edge side in the one joint surface.

12 Claims, 14 Drawing Sheets

(51) Int. Cl.
| | |
|---|---|
| *G10L 19/06* | (2013.01) |
| *B23K 26/24* | (2014.01) |
| *G01L 9/08* | (2006.01) |
| *G01L 19/14* | (2006.01) |
| *G01M 15/08* | (2006.01) |
| *G01L 19/06* | (2006.01) |

(52) U.S. Cl.
CPC ............ *G01L 19/142* (2013.01); *G01L 23/10* (2013.01); *G01M 15/08* (2013.01)

(58) Field of Classification Search
CPC ..... G01L 19/142; G01L 19/147; G01L 7/022; G01L 7/082; G01L 23/18; G01L 23/22; G01M 15/08; F02B 77/085; F02D 35/023; F02M 2200/247; B23K 33/008; B23K 26/24

USPC .............................................. 73/114.18, 756
See application file for complete search history.

(56) References Cited

U.S. PATENT DOCUMENTS

| | | | |
|---|---|---|---|
| 2008/0053237 A1* | 3/2008 | Matsui | G01L 23/18 73/756 |
| 2008/0116766 A1* | 5/2008 | Friedl | G01L 23/10 310/338 |
| 2012/0295125 A1* | 11/2012 | Uchida | B23K 26/30 428/594 |
| 2014/0201968 A1 | 7/2014 | Karst et al. | |
| 2016/0025580 A1* | 1/2016 | Ooya | G01L 19/0681 73/702 |

FOREIGN PATENT DOCUMENTS

| | | |
|---|---|---|
| JP | 2010-096656 A | 4/2010 |
| WO | WO 2013/03965 A1 | 1/2013 |
| WO | WO 2013/147260 A1 | 10/2013 |

OTHER PUBLICATIONS

Translation of JPS62168685.*
Farson et al, Taking advantage of laser welding, May 15, 2001, The Fabricator.*
MacMillan Dictionary: groove definition (Year: 2013).*
Cambridge English Dictionary: groove definition (Year: 2015).*
International Search Report (PCT/ISA/210) issued in PCT/JP2015/059137, dated Jun. 23, 2015.

* cited by examiner (a)

(b)

(c)

WELDED COMBUSTION PRESSURE SENSOR AND METHOD OF MANUFACTURING SAME

TECHNICAL FIELD

The present invention relates to a combustion pressure sensor and a method of manufacturing such a combustion pressure sensor which are suitably used when a combustion pressure is detected within the combustion chamber of an internal combustion engine.

BACKGROUND ART

Conventionally, as a combustion pressure sensor which detects a combustion pressure within the combustion chamber of an internal combustion engine, a pressure sensor disclosed in patent literature 1 is known.

The pressure sensor includes: a circular pressure reception diaphragm in which one surface is a pressure reception surface for receiving pressure to be measured and which is distorted by receiving the pressure to be measured on the pressure reception surface; a pressure transmission member in which one end portion is in contact with the other surface on the side opposite to the pressure reception surface of the pressure reception diaphragm; a sensor chip where a distortion sensing element is formed which is provided on the side of the other end portion opposite to the one end portion of the pressure transmission member and to which a force corresponding to the pressure to be measured received by the pressure reception diaphragm is applied through the pressure transmission member so as to generate the corresponding signal; and a cylindrical member which surrounds the pressure transmission member. In particular, as the basic structure, the pressure sensor has a structure in which a front end portion of a case formed with the cylindrical member and the pressure reception diaphragm are joined by welding and in which a pressure transmission portion located in a back end of the center portion of the pressure reception diaphragm is brought into contact with the pressure transmission member so as to transmit the force from the pressure transmission member to the sensor chip on the side of the back end where the distortion sensing element is formed.

CITATION LIST

Patent Literature

JP-No. 2010-96656

SUMMARY OF INVENTION

Technical Problem

However, in conventional combustion pressure sensors such as the pressure sensor disclosed in patent literature 1 described above, the following problems are present.

Specifically, in general, since a pressure detection device (combustion pressure sensor) which detects a combustion pressure within the combustion chamber of an internal combustion engine is exposed to the environment of a high temperature and a high pressure within the combustion chamber, and on the other hand, detection accuracy may be enhanced and a preload may be applied to a pressure reception member, the pressure detection device is used in an environment in which the combustion pressure and the preload acting in the direction opposite thereto are applied to a joint portion formed by the welding of the side of the pressure reception member and the side of a case member. Hence, the depth of the joint in the joint portion is required to be highly uniform and even over the entire circumference but in the conventional combustion pressure sensor, it is not easy to acquire the uniformity. Consequently, a variation in the effective pressure reception radius of a diaphragm and furthermore, a variation in the effective sensitivity are produced, and thus it is disadvantageously difficult to obtain a combustion pressure sensor which has high detection accuracy.

Such a problem will be specifically described below with reference to FIGS. 23 and 24. In FIG. 23, the pressure sensor disclosed in patent literature 1 is shown with an overview diagram, FIG. 24(a) shows a partially extracted and enlarged view of a circle L portion in FIG. 23 and FIGS. 24(b) to 24(d) show partially extracted and enlarged views of a circle X portion in FIG. 24(a).

The pressure sensor 5j shown in FIG. 23 includes a diaphragm 40j which is welded to a front end portion of a housing 31j that is hollow and cylindrical. In this way, a displacement of the diaphragm 40j is transmitted through a pressure transmission member 50j in contact with a pressure transmission portion located at a back end of the center portion thereof and a metal stem 65j to a sensor chip on a back end side where a distortion sensing element 10j is formed. The housing 31j is fixed to an enclosure 32j, and the enclosure 32j is fitted with a screw portion 32nj to a cylinder head 4j. In this way, the combustion pressure produced in the combustion chamber C is received by the diaphragm 40j, and is transmitted through the pressure transmission member 50j to the distortion sensing element 10j. In the distortion sensing element 10j, a variation in the resistance value caused by distortion is converted into a signal, and the signal is fed to a control device 6j.

On the other hand, in FIG. 24(a), symbol 10a represents the pressure transmission portion of the diaphragm 40j, symbol 10b represents a thin-walled distortion portion, symbol 10c represents an inside concave portion and symbol 10d represents an outer circumferential wall (welding portion). The position in which the entire diaphragm 40j is deformed by thermal distortion is indicated by an alternate long and short dashed line represented by y, and m represents the effective pressure reception radius of a pressure reception portion.

In this case, the diaphragm 40j and the housing 31j are welded over one circumference so as to provide a joint portion along the entire circumference, and when welding is performed over one circumference, conditions differ depending on the time of the start, the intermediate time and the time of completion due to problems such as the thermal inertia of the diaphragm and the housing, and thus it is not easy to make the depth of welding constant. Consequently, variations as shown in FIGS. 24(b) to 24(d) are produced. FIG. 24(b) shows a case where the depth of welding is insufficient and where the depth of welding is represented by t1. The effective pressure reception radius of the diaphragm here is represented by i. FIG. 24(c) shows a case where the depth of welding is ideal and where the depth of welding is represented by t2. The effective pressure reception radius of the diaphragm here is represented by m. FIG. 24(d) shows a case where the depth of welding is excessive and where the depth of welding is represented by t3. The effective pressure reception radius of the diaphragm here is represented by n. As described above, while welding is performed over one circumference, a variation in the depth of welding and furthermore, a variation in the effective pressure reception radius (i, m, n) of the diaphragm are produced, and consequently, there is a concern that a variation in the sensitivity of the combustion pressure is produced.

Hence, although in patent literature 1, an SIM analysis is used to determine the optimum values of the dimensions of the individual portions 10a, 10b, 10c and 10d in the pressure reception portion, and thus the variation in the sensitivity caused by thermal distortion attempts to be reduced, the basic cause is present in the welding step, with the result that there is a limitation to the dependence on the method disclosed in patent literature 1 in terms of removing the variation in the effective sensitivity to realize a combustion pressure sensor with high detection accuracy.

An objective of the present invention is to provide a combustion pressure sensor and a method of manufacturing it which solve the problems present in the background technology described above.

Solution to Problem

In order to solve the foregoing problems, according to the present invention, there is provided a combustion pressure sensor (5, 5A . . . ) including at least: a case member (31 . . . ) which has a joint surface (31a . . . ) on a side of a tip end and in which an opening portion is provided; a joint surface (41a . . . ) which is brought into planar contact with the joint surface (31a . . . ) of the case member (31 . . . ) so as to block the opening portion; a pressure reception member (40 . . . ) on which a combustion pressure acts; a welding portion (J2 . . . ) in which the joint surfaces (31a and 41a . . . ) are joined to each other; and a piezoelectric element (10 . . . ) which is stored in the case member (31 . . . ) and converts a pressing force based on the combustion pressure transmitted from the pressure reception member (40 . . . ) into a signal, where on a side of one edge side in at least the one joint surface (41a . . . ), the one joint surface (41a . . . ) is limited to a given depth of welding (t . . . ) from the other edge side, a predetermined clearance portion (90 . . . ) is provided so as to form a predetermined gap with the opposite other joint surface (31a . . . ) and a welding portion (J2 . . . ) is provided which includes at least all the limited joint surface (41a . . . ) from the other edge side in the one joint surface (41a . . . ).

In this case, in a preferred aspect of the invention, the clearance portion (90 . . . ) can be provided by a step portion (41b . . . ) which is formed on at least one of the pressure reception member (40 . . . ) and the case member (31 . . . ). On at least one of the pressure reception member (40 . . . ) and the case member (31 . . . ), a protrusion portion (31b . . . ) can be provided by being protruded and formed from the one edge side so as to cover the clearance portion (90 . . . ). As the pressure reception member (40 . . . ), a diaphragm (40) on which the combustion pressure acts can be used, and as the case member (31 . . . ), a cylindrical housing 31 can be used which includes a joint surface 31a joined to a joint surface 41a along an outer circumference of the diaphragm 40. On the other hand, the combustion pressure sensor (5, 5A . . . ) can be integrally formed with a functional component which is provided in an internal combustion engine 501, and an injector, a spark plug or a grow plug can be applied to the functional component. Here, as the pressure reception member (40 . . . ), a pressure reception ring block 514A on which the combustion pressure acts can be used, and as the case member (31 . . . ), a cylindrical outside enclosure 511A which has a joint surface 511a joined to a joint surface 514a along an outer circumference of the pressure reception ring block 514A and a cylindrical inside enclosure 512A which has a joint surface 512a joined to a joint surface 514a along an inner circumference of the pressure reception ring block 514A can be used.

On the other hand, in order to solve the foregoing problems, according to the present invention, there is provided a method of manufacturing a combustion pressure sensor, the method including: bring a joint surface (41a . . . ) provided in the pressure reception member (40 . . . ) on which a combustion pressure acts into planar contact with a joint surface (31a . . . ) provided in an opening portion on a side of a tip end of a case member (31 . . . ); joining the joint surfaces (31a and 41a) to each other through a welding portion (J2) so as to block the opening portion; and storing, in the case member (31 . . . ), a piezoelectric element (10 . . . ) which converts a pressing force based on the combustion pressure transmitted from the pressure reception member (40 . . . ) into a signal and outputs the signal, where previously, on a side of one edge side in at least the one joint surface (41a . . . ), the one joint surface (41a . . . ) is limited to a given depth of welding t from the other edge side, a predetermined clearance portion (90 . . . ) is provided so as to form a predetermined gap with the opposite other joint surface (31a . . . ) and a welding portion (J2) which includes at least all the limited joint surface (41a) is provided by performing welding from the other edge side in the one joint surface (41a . . . ) at a time of the welding.

In this case, in a preferred aspect of the invention, on at least one of the pressure reception member (40 . . . ) and the case member (31 . . . ), a protrusion portion (31b . . . ) protruding from the one edge side is formed, and at the time of the welding, the clearance portion (90 . . . ) can be covered with the protrusion portion (31b . . . ). A welding beam 400 . . . can be used for the welding. Here, an intensity of the welding beam 400 . . . is preferably set such that at least a depth of the welding portion (J2 . . . ) exceeds the depth of welding t . . . which is set.

Advantageous Effects of Invention

In the combustion pressure sensor (5, 5A . . . ) according to the present invention and the method of manufacturing it, the following remarkable effects are provided.

(1) Since in the combustion pressure sensor (5, 5A . . . ) according to the present invention, on a side of one edge side in at least the one joint surface (41a . . . ), the one joint surface (41a . . . ) is limited to a given depth of welding t . . . from the other edge side, a predetermined clearance portion (90 . . . ) is provided so as to form a predetermined gap with the opposite other joint surface (31a . . . ) and a welding portion (J2 . . . ) is provided which includes at least all the limited joint surface (41a . . . ) from the other edge side in the one joint surface (41a . . . ), the depth of welding t . . . can be made constant in all the welding positions. Consequently, it is possible to make constant the effective pressure reception diameter of the pressure reception member (40 . . . ), it is possible to obtain a highly accurate pressure signal in which the displacement of the sensitivity and the variation in the effective sensitivity are reduced and it is possible to provide the combustion pressure sensor (5, 5A . . . ) which has high detection accuracy and high reliability.

(2) Since in the method of manufacturing a combustion pressure sensor according to the present invention, previously, on a side of one edge side in at least the one joint surface (41a . . . ), the one joint surface (41a . . . ) is limited to a given depth of welding t . . . from the other edge side, a predetermined clearance portion (90 . . . ) is provided so as to form a predetermined gap with the opposite other joint surface (31a . . . ) and a welding portion (J2 . . . ) which includes at least all the limited joint surface (41a . . . ) is provided by performing welding from the other edge side in the one joint surface (41a . . . ) at a time of the welding, it is possible to easily and reliably manufacture the combustion pressure sensor (5, 5A . . . ) described above.

(3) In a preferred aspect, the clearance portion (90 . . . ) is provided by a step portion (41b . . . ) which is formed on at least one of the pressure reception member (40 . . . ) and the case member (31 . . . ), and thus it is possible to easily perform the operation with a smaller number of manufacturing steps excluding cutting and the like when the given depth of welding (t . . . ) is acquired.

(4) In a preferred aspect, on at least one of the pressure reception member (40 . . . ) and the case member (31 . . . ), a protrusion portion (31b . . . ) is provided by being protruded and formed from the one edge side so as to cover the clearance portion (90 . . . ), and thus the scattering of the weld spatters can be limited only within the clearance portion (90 . . . ), with the result that it is possible to remove a failure caused by the weld spatters such as an insulation failure of a live portion caused by the weld spatters scattered within the pressure detection portion.

(5) In a preferred aspect, in the combustion pressure sensor (5, 5A . . . ) according to the present invention, as the pressure reception member (40 . . . ), a diaphragm 40 on which the combustion pressure acts can be used, and as the case member (31 . . . ), a cylindrical housing 31 can be used which includes a joint surface 31a joined to a joint surface 41a along an outer circumference of the diaphragm 40 or as the pressure reception member (40 . . . ), a pressure reception ring block 514A on which the combustion pressure acts can be used, and as the case member (31 . . . ), a cylindrical outside enclosure 511A which has a joint surface 511a joined to a joint surface 514a along an outer circumference of the pressure reception ring block 514A and a cylindrical inside enclosure 512A which has a joint surface 512a joined to a joint surface 514a along an inner circumference of the pressure reception ring block 514A can be used. In other words, for example, the combustion pressure sensor (5, 5A . . . ) according to the present invention can be configured as a combustion pressure sensor which can be singly fitted to the combustion chamber of an internal combustion engine and can also be configured as a combustion pressure sensor which is fitted to a functional component provided in the combustion chamber of an internal combustion engine, with the result that it is possible to provide the combustion pressure sensor (5, 5A . . . ) which has high versatility and applicability and the method of manufacturing it.

(6) In a preferred aspect, the combustion pressure sensor (5, 5A . . . ) is integrally formed with a functional component which is provided in an internal combustion engine 501, and in particular, an injector, a spark plug or a grow plug is applied to the functional component, with the result that it is possible to provide the optimum combustion pressure sensor (5, 5A . . . ) which can be utilized for the internal combustion engine 501 mounted in an automobile or the like and a method of manufacturing it.

(7) In a preferred aspect, a welding beam (400 . . . ) is used for the welding, and thus when the welding portion (J2) in the present invention is provided, it is possible to perform the operation as the optimum form, and it is also possible to flexibly cope with, for example, conditions for a setting in which the intensity (welding performance) exceeds the depth of welding t . . . , with the result that it is possible to easily optimize the welding step.

REFERENCE SIGNS LIST (5, 5A . . . ): combustion pressure sensor, (10 . . . ): piezoelectric element, (31 . . . ): case member, 31: housing, (31a): joint surface of case member, 31a: joint surface of housing, (31b . . . ): protrusion portion, (40 . . . ): pressure reception member, 40: diaphragm, (41a): joint surface of pressure reception member, 41*a*: joint surface of diaphragm, (41*b* . . . ): step portion, (90 . . . ): clearance portion, (J2 . . . ): welding portion, t . . . : depth of welding, 501: internal combustion engine, 511A: outside enclosure, 511*a*: joint surface of outside enclosure, 512A: inside enclosure, 512*a*: joint surface of inside enclosure, 514A: pressure reception ring block, 514*a*: joint surface of pressure reception ring block, 400: welding beam

DESCRIPTION OF EMBODIMENTS

Preferred embodiments according to the present invention will then be described in detail with reference to drawings. The illustrated embodiments illustrate combustion pressure sensors for embodying the technical ideas of the present invention, and the present invention is not limited to the illustrated configurations. In particular, dimensions, materials, shapes, the relative arrangements thereof and the like described in the embodiments are not intended to limit the scope of the present invention unless otherwise specifically described but are simply illustrative examples. The same portions (the same constituent elements) are identified with the same designations and the same symbols, and thus the detailed described thereof will be omitted as necessary.

The outline of the present embodiment will first be described. The combustion pressure sensor according to the present embodiment relates to the improvement of the joint of a pressure reception member which receives the combustion pressure and a case member which holds the pressure reception member and a pressure detection portion. In a welding structure according to the present embodiment, the depth of welding can be made constant, the scattering of weld spatters is prevented and thus it is possible to remove a failure such as an insulation failure of the pressure detection portion over a live portion. The target of the illustrated first embodiment is a form in which the combustion pressure sensor is singly provided in the combustion chamber of an internal combustion engine, that is, a welding portion of a so-called cylinder-type combustion pressure sensor. On the other hand, the target of the illustrated second embodiment is a form in which the combustion pressure sensor is fitted to a functional component such as an injector or a spark plug and is provided in the combustion chamber, that is, a welding portion of a so-called ring-type combustion pressure sensor.

FIRST EMBODIMENT

Figure 1:
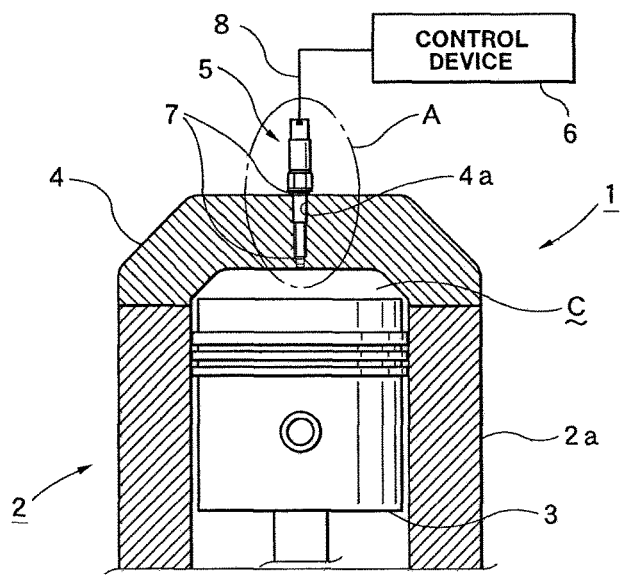
FIG. 1 is a schematic configuration diagram of an internal combustion engine to which a first embodiment of the present invention is applied.
Figure 2:
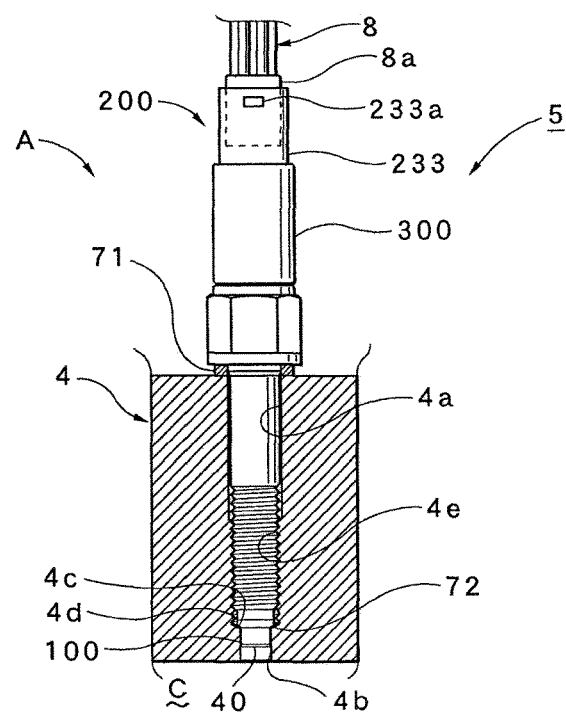
FIG. 2 is an enlarged view of an A region in FIG. 1.

The first embodiment will first be described. FIG. 1 shows a combustion pressure sensor 5 according to the first embodiment as an example and also shows a state where the combustion pressure sensor 5 is incorporated in a general internal combustion engine 1. FIG. 2 shows an enlarged view of an A region in FIG. 1.

The internal combustion engine 1 is formed with a cylinder block 2 including a cylinder 2*a*, a piston 3 which reciprocates within the cylinder 2*a* and a cylinder head 4, and a combustion chamber C is formed. When the internal combustion engine 1 is a gasoline engine, the internal combustion engine 1 generally includes a spark plug (not shown) which is fitted to the cylinder head 4 to detonate an air-fuel mixture within the combustion chamber C and an injector (not shown) which is fitted to the cylinder head 4 to inject fuel into the combustion chamber C.

The cylinder head 4 has a communication hole 4*a* which makes the combustion chamber C to which the combustion pressure sensor 5 according to the present embodiment is fitted communicate with the outside, and the combustion pressure sensor 5 is attached to the communication hole 4*a*. In this case, the combustion pressure sensor 5 is fixed with a screw formed in the communication hole 4*a* together with a seal member 7 which is interposed between the combustion pressure sensor 5 and the cylinder head 4 and which maintains hermeticity within the combustion chamber C. The internal combustion engine 1 also includes a transmission cable 8 for transmitting a pressure signal detected by the combustion pressure sensor 5 and a control device 6 which processes the pressure signal transmitted to feed a predetermined control signal to the internal combustion engine 1.

A specific structure when the combustion pressure sensor 5 is attached to the cylinder head 4 will then be described with reference to FIG. 2. In FIG. 2, symbol 4*a* represents the above-described communication hole which is formed in the cylinder head 4 and makes the combustion chamber C communicate with the outside. In the shape of the communication hole 4*a*, sequentially from the side of the combustion chamber C, a first hole portion 4*b*, an inclination portion 4*c* whose diameter is gradually increased from the diameter of the first hole portion 4*b* and a second hole portion 4*d* whose diameter is larger than that of the first hole portion 4*b* are provided. In the surrounding hole wall forming the second hole portion 4*d*, a female screw portion 4*e* is formed, and a male screw formed in the enclosure of the combustion pressure sensor 5 is screwed thereinto, and thus the combustion pressure sensor 5 is securely fixed through a first seal member 71.

In the combustion pressure sensor 5, a pressure detection portion 100 at its tip end serves as a pressure reception portion, and a diaphragm 40 is arranged in such a position as to face the combustion chamber C. Here, between the abutting portion of the pressure detection portion 100 in the combustion pressure sensor 5 and the inclination portion 4*c* of the communication hole 4*a* formed in the cylinder head 4, a second seal member 72 is interposed. In this way, it is possible to maintain the hermeticity such that the air-fuel mixture and the combustion gas are prevented from leaking from the side of the combustion chamber C. On the outer portion of the cylinder head 4, a connector portion 233 is provided in which a signal processing portion 200 is arranged. The connector portion 233 is connected to the control device 6 through a connector 8*a* and the transmission cable 8 along which the pressure signal is transmitted. A hook provided in the connector 8*a* is locked by being engaged with a hole 233*a* formed in the connector portion 223.

Figure 3:
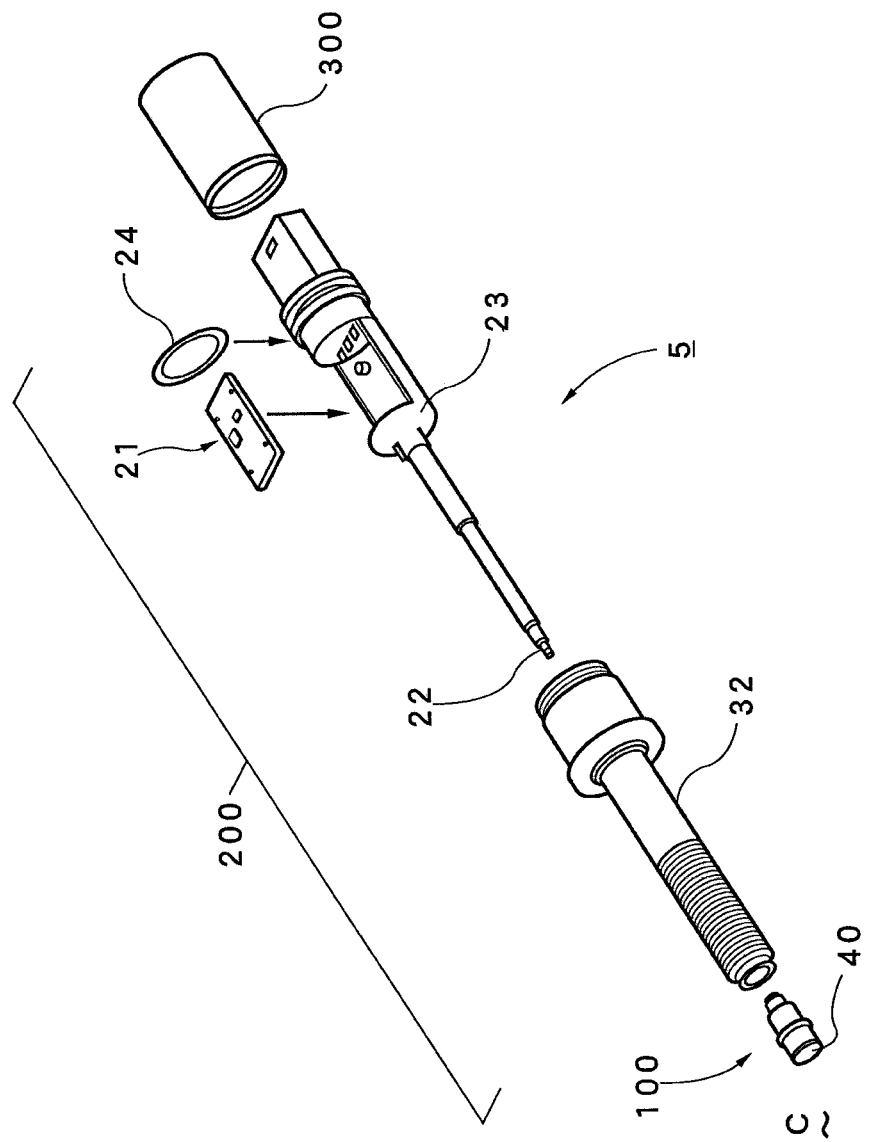
FIG. 3 is an exploded perspective view of a combustion pressure sensor according to the first embodiment.

The configuration of the combustion pressure sensor according to the first embodiment will then be specifically described with reference to FIGS. 3 and 4. In FIG. 3, the side of the diaphragm 40 located on the left side is the side of the tip end of the combustion pressure sensor 5, and the side of the signal processing portion 200 located on the right side is the side of the back end of the combustion pressure sensor 5.

The combustion pressure sensor 5 includes the pressure detection portion 100 which has a piezoelectric element that converts the combustion pressure produced within the combustion chamber C into an electrical signal and the signal processing portion 200 which transmits and processes the signal from the pressure detection portion 100. In FIG. 3, a member which holds the pressure detection portion 100 with the diaphragm 40 is an enclosure 32. The enclosure 32 externally has the screw portion and a hexagonal nut portion for fixing to the cylinder head 4, and internally has a through hole in which the tip end of an insulating member 23 storing a circuit board portion 21 is stored. In a through hole formed within the insulating member 23, a conductive member 22 for performing electrical connection to the pressure detection portion 100 is stored. Furthermore, the pressure detection portion 100 is inserted into a hole on the side of the tip end of the enclosure 32 and is fixed to the enclosure 32 by welding. A holding member 300 into which the side of the tip end of the insulating member 23 storing the circuit board portion 21 is inserted together with the circuit board portion 21 is inserted into a hole on the side of the back end, and is fixed by being swaged to a groove on the side of the back end of the enclosure 32. Here, an O-ring 24 is inserted into a groove portion of the insulating member 23, and thus the hermeticity of the circuit board portion 21 can be maintained.

Figure 4:
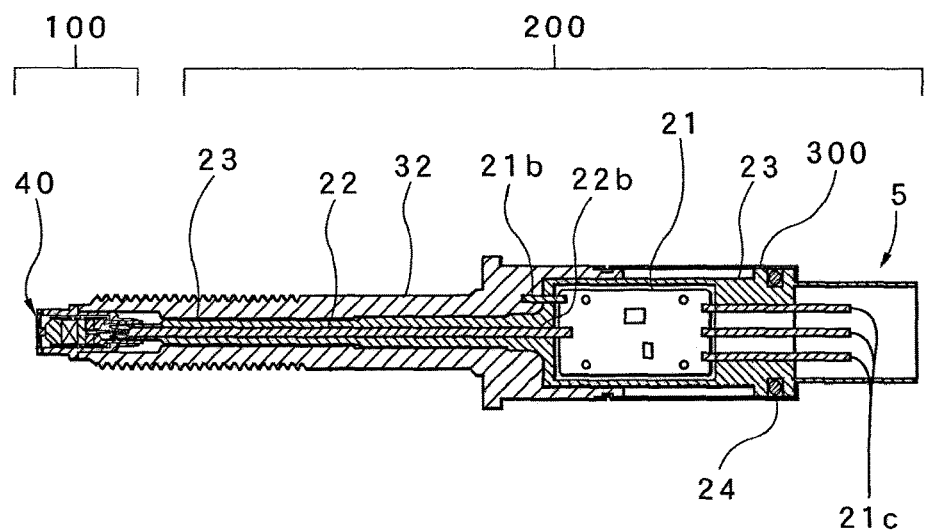
FIG. 4 is a cross-sectional view of the combustion pressure sensor according to the first embodiment.

On the other hand, as shown in FIG. 4, the side of the tip end of the conductive member 22 is electrically connected to the pressure detection portion 100 with a coil spring which will be described later, and the side of the back end is electrically connected by soldering the connection portion 22b of the conductive member 22 to the pattern portion of the circuit board portion 21 and is fixed. A first connection pin 21b is connected to the circuit board portion 21, and the circuit board portion 21 is grounded to the enclosure 32. Furthermore, three second connection pins 21c are soldered to the pattern portion of the circuit board portion 21, and the connection pins 21c are inserted into the connector 8 (see FIG. 2). In this way, the circuit board portion 21 and the control device 6 are electrically connected to each other.

Example 1

The configuration of a combustion pressure sensor 5A according to example 1 of the first embodiment will then be described with reference to FIGS. 5 and 6.

Figure 5:
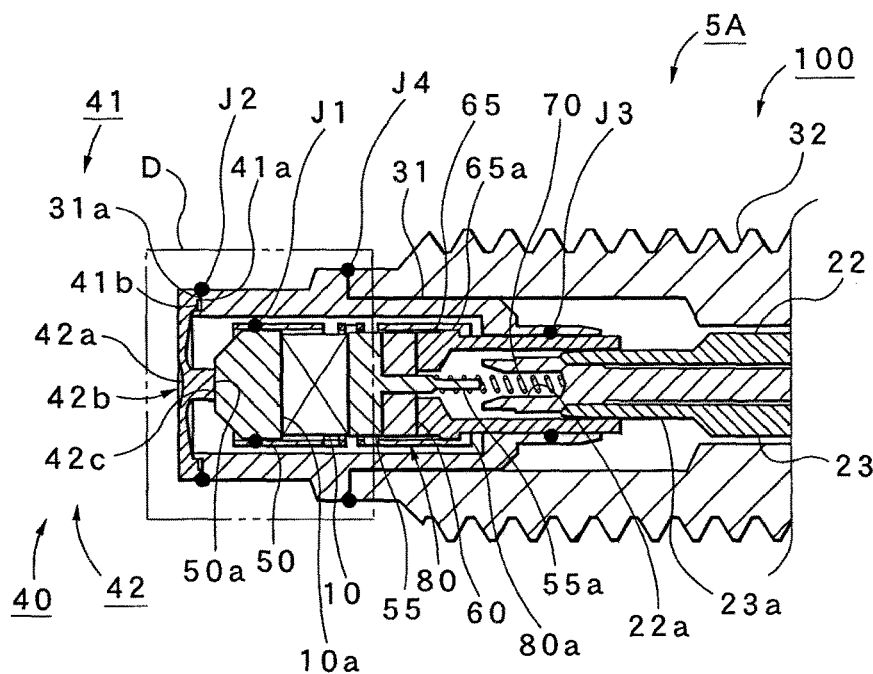
FIG. 5 is a cross-sectional view showing part of a combustion pressure sensor in example 1 according to the first embodiment.

FIG. 5 shows an enlarged view of the pressure detection portion 100 in FIG. 4. The pressure detection portion 100 is formed with: a housing 31 which serves as a frame member of the pressure detection portion 100; a diaphragm 40 which is provided so as to block an opening portion on the side of the tip end of the housing 31 and receives the pressure (combustion pressure) within the combustion chamber C; a pressure transmission member 50 with which a back end surface 42c of a protrusion portion 42a formed in the diaphragm 40 makes contact so as to transmit a displacement of the diaphragm 40 caused by the pressure; a piezoelectric element 10 which makes contact with the pressure transmission member 50 to receive a pressure (pressing force) from the pressure transmission member 50 and thereby generates a charge; a second electrode portion 55 which supports the piezoelectric element 10 and which receives the generated charge as an electrical signal; an insulating ring 60 which supports and insulates the second electrode portion 55; a support member 65 which supports the insulating ring 60; a pressing member 80 in which one end is fixed to the pressure transmission member 50 and the other end is fixed to the support member 65 such that a portion between the fixed portions is formed with a cylindrical portion.

On the side of the tip end of the housing 31, an end surface 31a is formed, and on the side of the inner circumferential surface of the end surface 31a, as shown in FIG. 6(b), a protrusion portion 31b in the shape of a ring along the circumferential surface is formed so as to protrude from the end surface 31a. On the other hand, the diaphragm 40 includes a cylindrical portion 41 in the shape of a cylinder and an inside portion 42 which is formed thereinside. An end surface (joint surface) 41a formed on the side of the back end of the cylindrical portion 41 makes contact with the end surface (joint surface) 31a formed on the side of the tip end of the housing 31. On the side of the center of the end surface 41a, as shown in FIG. 6(b), a step portion 41b is formed which is in the shape of a notch that is concave toward the side of the tip end and is in the shape of a ring along the circumferential direction. In this way, the substantial width dimension of the end surface 41a in the radial direction, that is, a welding distance is t. The inside portion 42 serves as a disc-shaped thin-walled member provided so as to block an opening on the side of the tip end of the cylindrical portion 41, and in the center portion thereof, the protrusion portion 42a is provided so as to protrude from the back end surface to the side of the piezoelectric element 10. In the center portion of the inside portion 42 on the side of the tip end, a concave portion 42b is provided.

A welding method when the pressure detection portion 100 is manufactured will then be described with reference to FIGS. 5 and 6. FIG. 6(a) shows an enlarged view of a D region in FIG. 5, and FIGS. 6(b) and 6(c) show enlarged views of an E region in FIG. 6(a).

The pressure detection portion 100 welds and fixes individual welding portions in a predetermined order and with a predetermined method, and thus it is possible to obtain predetermined performance. In FIG. 5, the welding portions J1 . . . are individually represented by the mark of •. The mark of • does not represent the shape of the welding but simply indicates the position of the welding. A laser welding method is used in the welding so as to continuously perform welding over one circumference (the entire circumference) and thereby seal a welding surface. The welding method can likewise be applied to the other examples which will be described later.

The welding portion J1 will first be welded. The cylindrical portion of the pressing member 80 is passed from the side of the back end of the support member 65. Here, the cylindrical portion is pushed in such that a protrusion 80a formed in the inner circumference of the pressing member 80 in the shape of a ring is hooked to a protrusion 65a formed in the outer circumference of the support member 65 in the shape of a ring. The outside diameter of the protrusion 65a formed in the support member 65 is made larger than the inside diameter of the corresponding pressing member 80, and fitting (press-fitting) is performed by a so-called interference fit. Then, the insulating ring 60, the second electrode portion 55, the piezoelectric element 10 and the pressure transmission member 50 are inserted in this order from the side of the tip end of the pressing member 80. Then, in order to enhance the sensitivity and the linearity of the piezoelectric element 10, a preload is applied. In this case, a predetermined load is applied to the protrusion portion 80a of the pressing member 80 and the pressure transmission member 50 in a direction in which the piezoelectric element 10 is sandwiched, and the side of the tip end of the pressing member 80 is welded and fixed to an engagement portion (circumferential surface) with the pressure transmission member 50. In this way, it is possible to provide the welding portion J1 and to obtain a piezoelectric element portion.

The welding portions J2 and J3 will then be welded. The piezoelectric element portion described above is assembled to the housing 31. In this case, the piezoelectric element portion is inserted from the side of the tip end of the housing 31 and is temporarily inserted to the deepest portion. Then, the joint surface 31a of the housing 31 is brought into contact with the joint surface 41a of the diaphragm 40. Here, as shown in FIG. 6(a), the diaphragm 40 is guided to the protrusion portion 31*b* formed on the joint surface 31*a* of the housing 31 and is fitted thereto by a so-called clearance fit. In this state, the welding of the welding portion J2 to the joint surface is performed with a welding beam 400.

Figure 6:
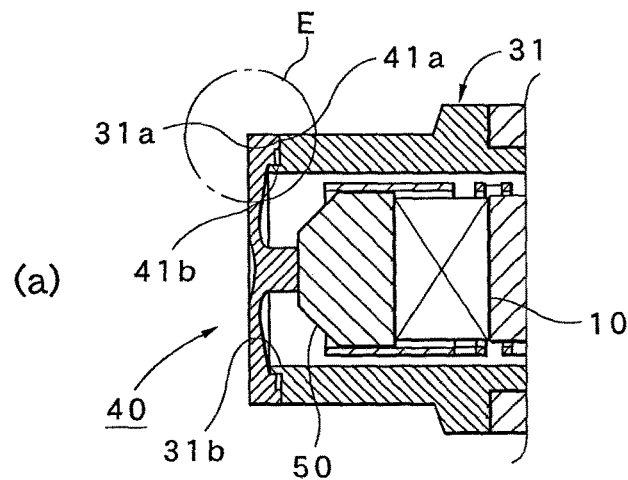
FIG. 6 is an extracted and enlarged view of a D region in FIG. 5.
Figure 6:
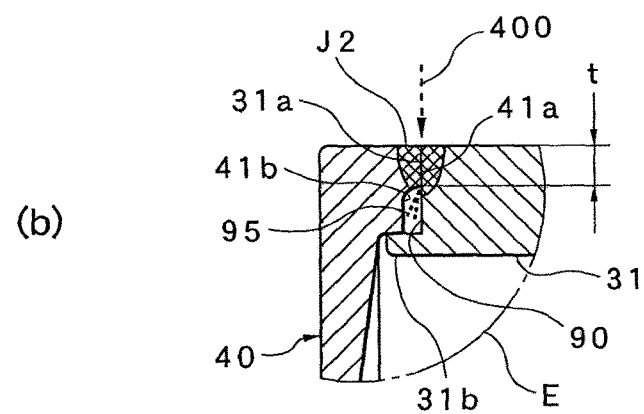
Figure 6:
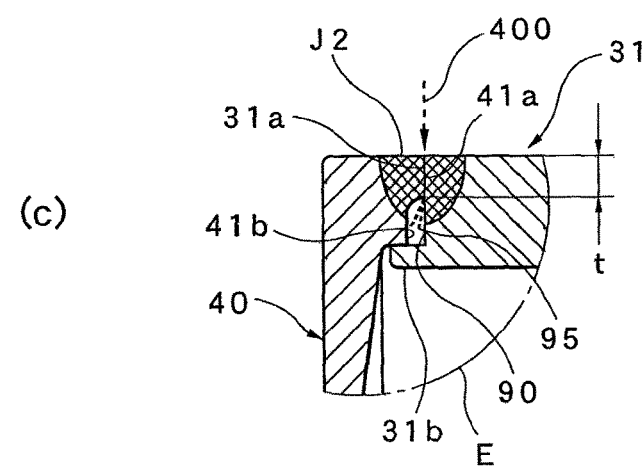

FIG. 6(*b*) shows a state where the joint surface 41*a* of the diaphragm 40 makes contact with the joint surface 31*a* of the housing 31 to provide the welding portion J2. Here, symbol 400 represents the welding beam from the side of the outer circumference. The welding beam 400 is set so as to reach a depth which slightly exceeds the welding distance t. In this case, on the joint surface 41*a* of the diaphragm 40, the step portion 41*b* is formed, and thus when the diaphragm 40 is brought into contact with the housing 31, the gap of a clearance portion 90 is formed by the joint surface 31*a* and the step portion 41*b*. In this way, the diaphragm 40 and the welding portion J2 of the housing 31 are prevented from proceeding beyond the welding distance t.

FIG. 6(*c*) shows a state where the welding beam 400 reaches a deeper portion. Even in this case, since the clearance portion 90 is present, the welding portion J2 is prevented from proceeding beyond the welding distance t.

As described above, when the depth of welding is set, with consideration given to the influences of thermal inertia and the like, the depth of welding is selected so as to be equal to or more than the welding distance t at least, and thus the welding distance t which is the depth of welding can be kept constant. Moreover, the protrusion portion 31*b* provided on the joint surface 31*a* of the housing 31 is formed so as to sandwich the step portion 41*b* provided in the diaphragm 40 and to be opposite the welding portion J2, and thus the scattering of weld spatters 95 produced at the time of welding is prevented, and since the function of holding the weld spatters 95 within the clearance portion 90 is achieved, as a secondary effect, it is possible to avoid a failure in which the weld spatters 95 are scattered in a space where the piezoelectric element is present.

Then, a predetermined load is applied, as shown in FIG. 5, from the side of the back end surface of the support member 65 toward the side of the tip end surface to the piezoelectric element portion which is temporarily inserted into the housing 31. Here, the amount of displacement of the inside portion 42 of the diaphragm 40 is measured, and thus when the protrusion portion 42*c* of the diaphragm 40 makes contact with the abutting surface 50*a* of the pressure transmission member 50, and a predetermined amount of displacement is produced, the welding of the housing 31 and the support member 65 is performed with the welding beam 400 described previously. In this way, it is possible to provide the welding portion J3, and to obtain the pressure detection portion 100.

Then, the welding portion J4 is welded. As shown in FIG. 5, the pressure detection portion 100 is fitted to the inner circumferential portion on the side of the tip end of the enclosure 32, and here a coil spring 70 is engaged with the protrusion portion 55*a* of the second electrode portion 55 and is thereby incorporated in a state where it is compressed to the hole portion 22*a* of the conductive member 22. In a state where the conductive member 22 is fitted into the hole of the insulating member 23, the tip end portion 23*a* of the insulating member 23 is fitted into the hole on the side of the back end of the support member 65. In this state, the welding of the protrusion portion of the pressure detection portion 100 in the shape of a ring and the end surface on the side of the tip end of the enclosure 32 is performed with the welding beam 400 described previously. In this way, the welding portion J4 can be provided, and the pressure detection portion 100 is electrically connected to the signal processing portion 200, with the result that the combustion pressure sensor 5A is completed.

As described above, the combustion pressure sensor 5A according to example 1 includes, as the basic structure, at least; the housing 31 in which the opening portion with the joint surface 31*a* on the side of the tip end is provided; the joint surface 41*a* which makes planar contact with the joint surface 31*a* of the housing 31 to block the opening portion; the diaphragm 40 on which the combustion pressure acts; the welding portion J2 which joins the joint surfaces 31*a* and 41*a*; and the piezoelectric element 10 which is stored in the housing 31 and converts, into a signal, the pressing force based on the combustion pressure transmitted from the diaphragm 40. According to the present invention, the combustion pressure sensor 5A also includes: the predetermined clearance portion 90 in which at least on the side of one edge side in the one joint surface 41*a*, the one joint surface 41*a* is limited to the predetermined depth of welding t from the other edge side, and in which a predetermined gap is formed with respect to the opposite other joint surface 31*a*; and the welding portion J2 which includes at least all the limited joint surfaces 41*a* from the other edge side in the one joint surface 41*a*.

An electrical connection configuration and an operation in the combustion pressure sensor 5A will then be described with reference to FIGS. 4 and 5.

In FIG. 5, an end surface 10*a* on the side of the tip end of the piezoelectric element 10 is electrically connected to the metallic housing 31 through the metallic pressure transmission member 50 and the metallic diaphragm 40. In the signal processing portion 200 of FIG. 4, one side of the first connection pin 21*b* is soldered to the circuit board portion 21, and the other side is press-fitted into a hole for the pin provided in the metallic enclosure 32. In this way, the GND of the circuit board portion 21 is grounded to the enclosure 32. Since the enclosure 32 and the housing 31 are joined through the welding portion J4 described previously, they are electrically connected.

On the other hand, an end surface on the side of the back end of the piezoelectric element 10 is soldered from the metallic second electrode portion 55 and the protrusion portion 55*a* thereof through the coil spring 70 and the metallic conductive member 22 to the circuit board portion 21, and is electrically connected. The second electrode portion 55 and the protrusion portion 55*a* are electrically insulated by the insulating ring 60 formed with an insulator from the surrounding support member 65, and are also separated from the inner circumferential surface of the pressing member 80, and thus they are electrically insulated. Then, when the combustion pressure sensor 5A is fitted to the cylinder head 4, the enclosure 32 is electrically connected to the cylinder head 4 through the female screw portion 4*e* formed in the communication hole 4*a* of the cylinder head 4, and is further grounded to an automobile body.

In this way, the internal combustion engine 1 is brought into an operated state, and when the combustion pressure is produced within the combustion chamber C, the combustion pressure acts on the diaphragm 40 at the tip end of the combustion pressure sensor 5A, and a displacement based on the action is transmitted through the pressure transmission member 50 to the piezoelectric element 10. Consequently, a charge corresponding to the combustion pressure is generated. Then, the charge generated in the piezoelectric element 10 is supplied to the circuit board portion 21 and is subjected to amplification processing in the circuit board portion 21, and a voltage corresponding to the charge is supplied to the control device 6 through the second connection pins 21c and the transmission cable 8.

Hence, according to the combustion pressure sensor 5A based on example 1 of the first embodiment, since the step portion 41b is provided on the joint surface 41a of the diaphragm 40 in a combustion pressure sensor which is singly fitted to the combustion chamber C, the clearance portion 90 can be provided in which the diaphragm 40 does not make contact with the housing 31. Consequently, since the depth of welding (the welding distance t) can be made constant along the circumferential direction by the clearance portion 90, the effective pressure reception diameter of the diaphragm 40 can be made constant, with the result that it is possible to provide the combustion pressure sensor 5A which reduces the displacement of the sensitivity and can acquire a highly accurate pressure signal.

Since the clearance portion 90 of the housing 31 is sandwiched, and the protrusion portion 31b is present in the position opposite the welding portion J2, for example, the scattering of the weld spatters 95 is prevented, and thus it is possible to remove a failure such as an insulation failure of the pressure detection portion over a live portion, and moreover, the scattering of the weld spatters 95 over the contact portion between the diaphragm 40 and the pressure transmission member 50 is prevented, and thus the wear and degradation of the contact portion can be reduced, with the result that it is possible to provide the highly reliable combustion pressure sensor 5A.

With consideration given to the influence of thermal inertia, the intensity of the welding beam 400 such as laser is preferably set such that the depth of welding exceeds the welding distance t of the housing 31 and the diaphragm 40 at least. Although in example 1, the case where the protrusion portion 31b is provided on the housing 31 and the step portion 41b is provided on the diaphragm 40 is described, as will be described below, the protrusion portion 31b may be provided on the diaphragm 40, and the step portion 41b may be provided on the housing 31. Furthermore, both the protrusion portion 31b and the step portion 41b can be provided on one of the housing 31 and the diaphragm 40 or on each of the housing 31 and the diaphragm 40.

Example 2

A combustion pressure sensor 5B according to example 2 of the first embodiment will then be described with reference to FIGS. 7 and 8.

Figure 7:
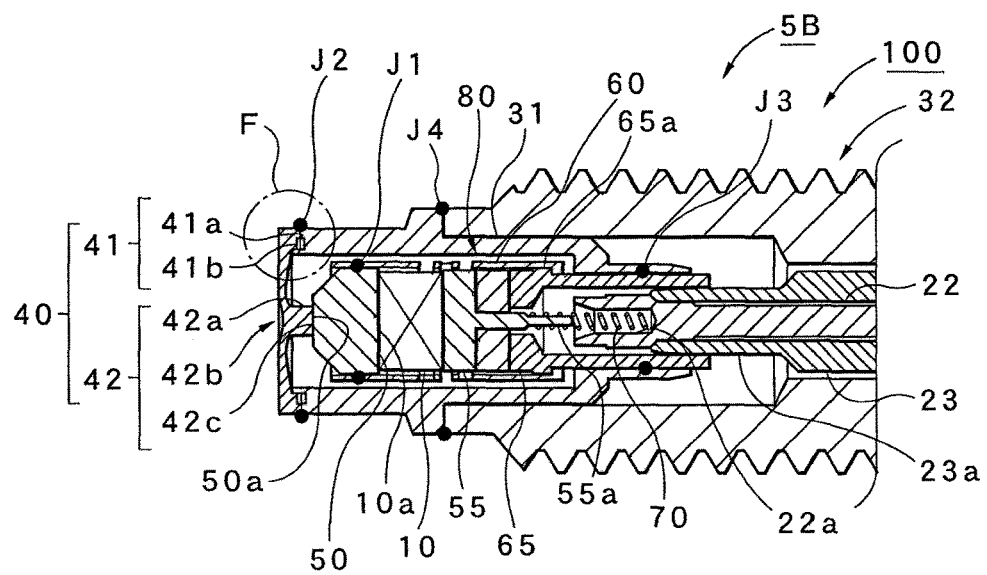
FIG. 7 is a cross-sectional view showing part of a combustion pressure sensor in example 2 according to the first embodiment.
Figure 8:
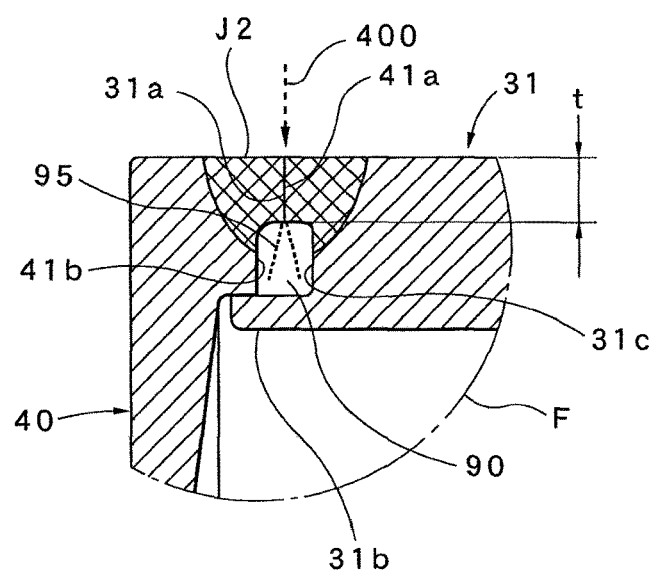
FIG. 8 is an extracted and enlarged view of an F region in FIG. 7.

FIG. 7 shows a cross-sectional view of the pressure detection portion 100 of the combustion pressure sensor 5B, and FIG. 8 shows an enlarged view of an F region in FIG. 7. The combustion pressure sensor 5B shown in FIG. 7 differs in that in addition to the configuration of the joint surface on the side of the diaphragm 40 indicated in the combustion pressure sensor 5A according to example 1 described above, the same step portion 31c as the step portion 41b is provided on the joint surface 31a of the housing 31. Since the other basic configurations and the assembly procedure are the same as in example 1, the same portions (the same constituent elements) are identified with the same numbers, and part of the repeated description will be omitted. The same numbers are added to the same portions and the same constituent elements, and the letter "B" of the alphabet added to the number indicates example 2. Hence, in example 1, "A" is added.

In this way, since as shown in FIG. 8, the step portion 31c is also formed on the joint portion 31a on the side of the housing 31, the step portion 31c is combined with the step portion 41b formed on the diaphragm 40, and thus the clearance portion 90 as shown in FIG. 8 can be formed between the diaphragm 40 and the housing 31. Hence, since in the combustion pressure sensor 5B of example 2, the clearance portion 90 can be enlarged to substantially twice the clearance portion 90 of example 1, it is possible to reliably achieve the effect of making constant the depth of welding (the welding distance t) produced by the clearance portion 90.

Example 3

A combustion pressure sensor 5C according to example 3 of the first embodiment will then be described with reference to FIGS. 9 and 10.

Figure 9:
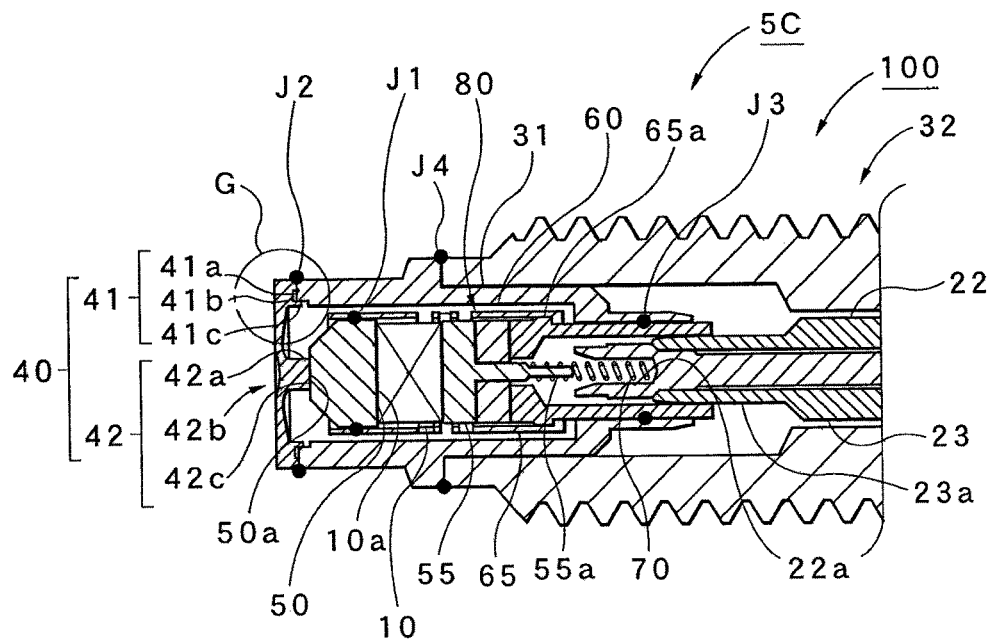
FIG. 9 is a partial cross-sectional view showing a combustion pressure sensor in example 3 according to the first embodiment.
Figure 10:
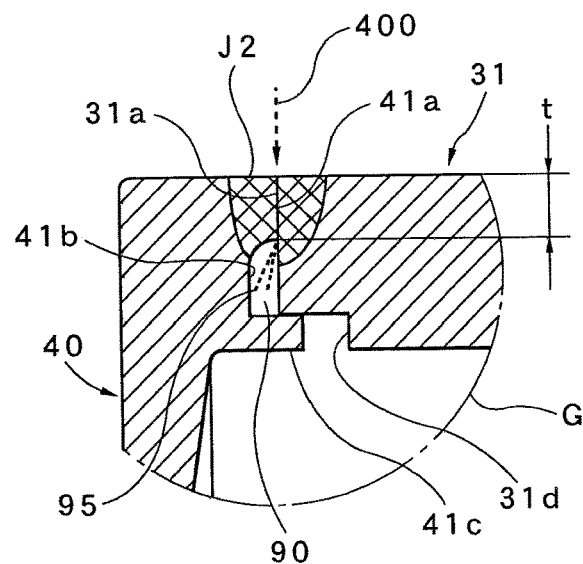
FIG. 10 is an extracted and enlarged view of a G region in FIG. 9.

FIG. 9 shows a cross-sectional view of the pressure detection portion 100 of the combustion pressure sensor 5C, and FIG. 10 shows an enlarged view of a G region in FIG. 9. The combustion pressure sensor 5C differs from the combustion pressure sensor 5A according to example 1 described previously in that the same protrusion portion 41c as the protrusion portion 31b described previously is provided on the side of the diaphragm 40. Since the other basic configurations are the same as in example 1, the same portions (the same constituent elements) are identified with the same numbers, and part of the repeated description will be omitted. The same numbers are added to the same portions and the same constituent elements, and the letter "C" of the alphabet added to the number indicates example 3.

In this way, as shown in FIG. 10, the cylindrical portion 41 of the diaphragm 40 includes not only the contact surface 41a to the housing 31 and the step portion 41b but also the protrusion portion 41c. On the other hand, on the side of the inside diameter of the housing 31, a notch portion 31d is provided so as to correspond to the protrusion portion 41c, and the protrusion portion 41c of the diaphragm 40 is overlapped. Hence, the combustion pressure sensor 5C according to example 3 can also obtain the same effects as the combustion pressure sensor 5A according to example 1.

Example 4

A combustion pressure sensor 5D according to example 4 of the first embodiment will then be described with reference to FIGS. 11 and 12.

Figure 11:
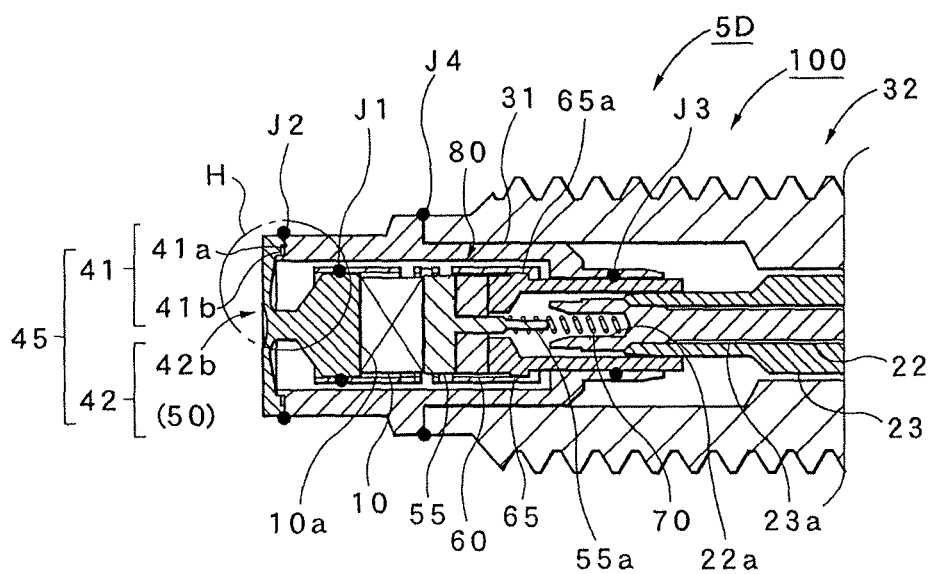
FIG. 11 is a partial cross-sectional view of a combustion pressure sensor in example 4 according to the first embodiment.
Figure 12:
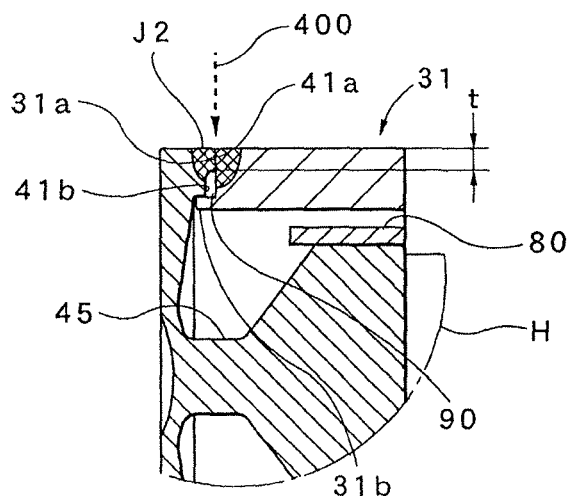
FIG. 12 is an extracted and enlarged view of an H region in FIG. 11.

FIG. 11 shows a cross-sectional view of the pressure detection portion 100 of the combustion pressure sensor 5D, and FIG. 12 shows an enlarged view of an H region in FIG. 11. The combustion pressure sensor 5D shown in FIG. 11 differs from the combustion pressure sensor 5A according to example 1 described previously in that the diaphragm 40 and the pressure transmission member 50 are integrally formed and that a diaphragm 45 which together has the functions of the two members is used.

Hence, as shown in FIG. 12, the configurations of the joint surface 41a and the step portion 41b of the cylindrical portion 41 in the diaphragm 40 and the configurations of the joint surface 31a and the protrusion portion 31b of the housing 31 are the same as in example 1. The same is true for the welding method, and since the clearance portion 90 and the protrusion portion 31b are provided, it is possible to obtain the same effects as in the case of the combustion pressure sensor 5A according to example 1. Since the basic configurations and the assembly procedure in the combustion pressure sensor 5D are the same as in example 1, the same portions (the same constituent elements) are identified with the same numbers, and part of the repeated description will be omitted. The same numbers are added to the same portions and the same constituent elements, and the letter "D" of the alphabet added to the number indicates example 4.

Second Embodiment

Figure 13:
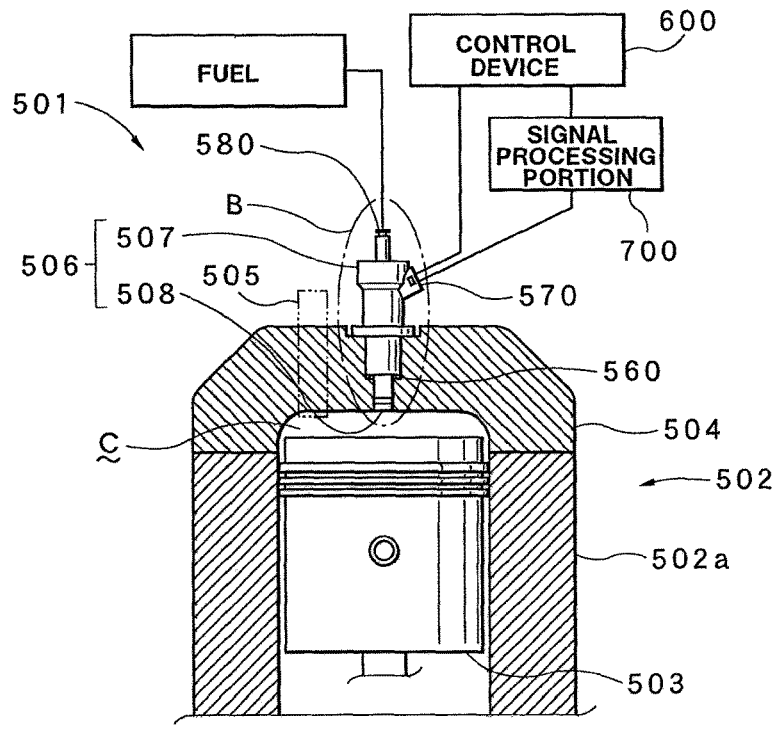
FIG. 13 is a schematic configuration diagram of an internal combustion engine to which a second embodiment of the present invention is applied.
Figure 14:
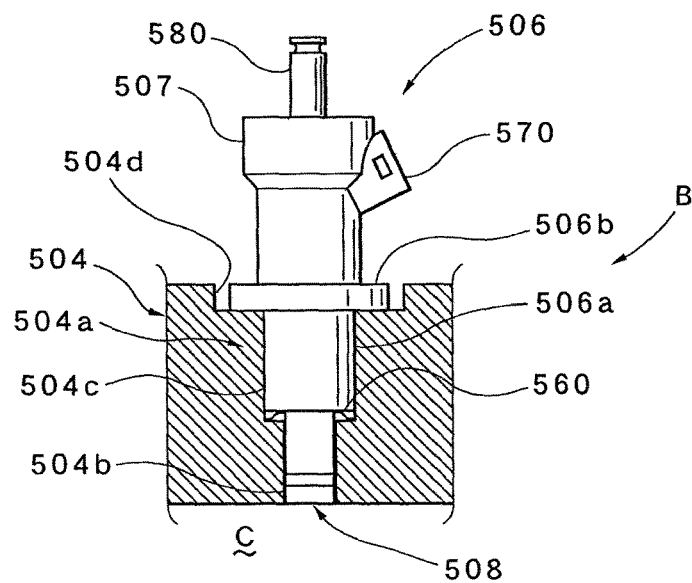
FIG. 14 is an extracted and enlarged view of a B region in FIG. 13.
Figure 15:
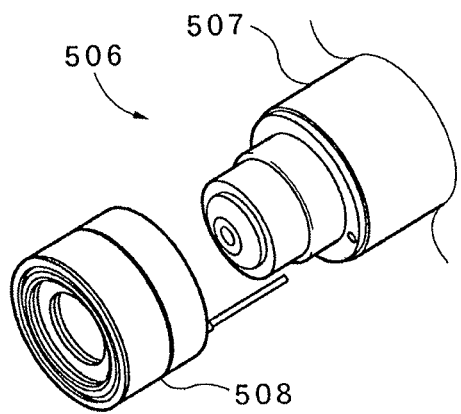
FIG. 15 is an illustrative perspective view when a pressure detection portion shown in FIG. 14 is fitted to a functional component (injector)
Figure 16:
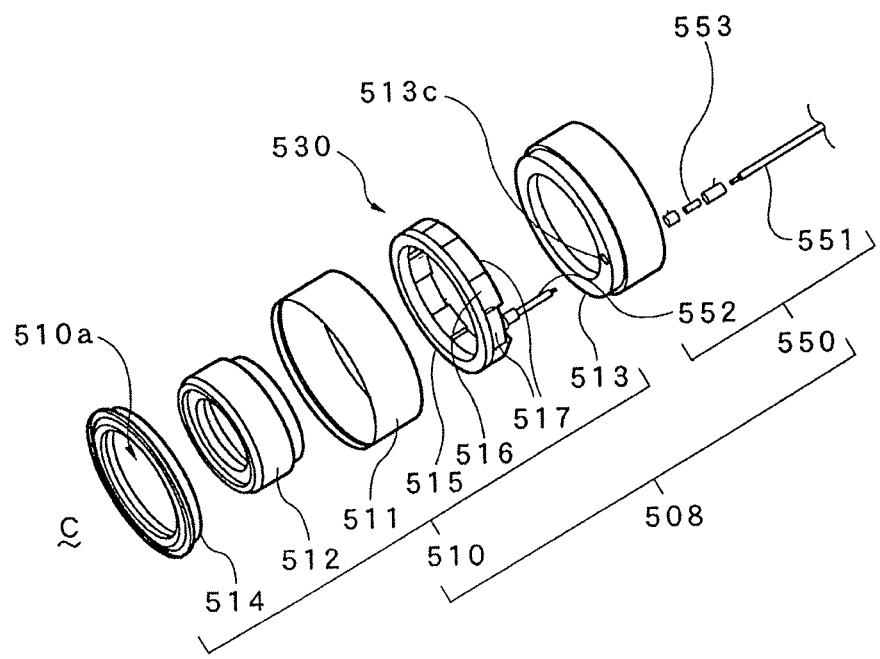
FIG. 16 is an exploded perspective view of the pressure detection portion shown in FIG. 15.

The second embodiment will then be described. FIG. 13 shows a combustion pressure sensor 5 according to the second embodiment as an example and also shows a state where the combustion pressure sensor 5 is incorporated in a general internal combustion engine 1. FIGS. 14 to 16 show the structure of a combustion pressure sensor 508 according to the second embodiment.

FIG. 13 shows a schematic configuration diagram of an internal combustion engine 501, and FIG. 14 shows an enlarged view of a B region in FIG. 10. The combustion pressure sensor 508 according to the second embodiment is a combustion pressure sensor which is integrally combined with the functional components such as the injector and the spark plug provided in the combustion chamber C.

FIG. 13 shows an internal combustion engine 501 to which an injector unit 506 with the combustion pressure sensor 508 according to the second embodiment is fitted. The internal combustion engine 501 is formed with a cylinder block 502 which has a cylinder 502a, a piston 503 and a cylinder head 504, and includes the combustion chamber C therewithin. When the internal combustion engine 501 is a gasoline engine, the internal combustion engine 501 includes the injector unit 506 which is provided in the cylinder head 504 to inject fuel into the combustion chamber C and a spark plug 505 which is provided in the cylinder head 504 to burn an air-fuel mixture within the combustion chamber C and is simply indicated by alternate long and short dashed lines. The injector unit 506 includes the combustion pressure sensor 508 which is integrally provided at the tip end portion of an injector 507.

The structure in which the injector unit 506 is provided tin the cylinder head 504 will then be described with reference to FIG. 14. In FIG. 14, the cylinder head 504 includes the combustion chamber C for providing the injector unit 506 and a communication hole 504a which communicates with the outside. The communication hole 504a has, from the side of the combustion chamber C, a first hole portion 504b, a second hole portion 504c whose diameter is larger than that of the first hole portion 504b and a third hole portion 504d whose diameter is larger than that of the second hole portion 504c. The injector unit 506 is attached in a state where the injector unit 506 penetrates the communication hole 504a and is formed such that the combustion pressure sensor 508 is located close to the combustion chamber C of the first hole portion 504b, and the outside diameter of the combustion pressure sensor 508 is slightly smaller than the diameter of the first hole portion 504b.

The body portion 506a of the injector unit 506 is inserted into the second hole portion 504c through a gasket 560, and is fitted thereinto by a so-called clearance fit. Here, in the third hole portion 504d, the flange portion 506b of the injector unit 506 is arranged. The injector unit 506 is clamped on the upper surface of the flange portion 506b with a clamp device (not shown) provided outside the cylinder head 504, and the gasket 560 is compressed. In this way, hermeticity is maintained so that the air-fuel mixture and the combustion gas are prevented from leaking from the side of the combustion chamber C. Furthermore, as shown in FIG. 14, in order to transmit, to the outside, a pressure signal detected by the combustion pressure sensor 508 attached to the outer circumference of the tip end portion, the injector unit 506 includes an electrical connector portion 570 for connection and a fuel connector portion 580 for supplying the fuel to the injector 507.

On the other hand, the internal combustion engine 501 includes a signal processing portion 700 which receives an electrical signal that is a weak charge obtained from the piezoelectric element to amplify and process the electrical signal and a control device 600 which receives the processed signal to feed a predetermined control signal to the internal combustion engine.

The configuration of the combustion pressure sensor 508 according to the second embodiment will then be described with reference to FIGS. 15 and 16. FIG. 15 shows a configuration in which the combustion pressure sensor 508 is fitted to the injector 507, and FIG. 16 shows an exploded perspective view of the combustion pressure sensor 508.

FIG. 15 shows how the ring-type combustion pressure sensor 508 is fitted to the tip end portion of the injector 507, and after the fitting, the joint portions of them are welded so as to form the integral injector unit 506. On the other hand, in FIG. 16, the combustion pressure sensor 508 according to the second embodiment includes a pressure detection portion 510 which has a piezoelectric element for converting the combustion pressure produced within the combustion chamber C into an electrical signal and a transmission unit 550 for transmitting the signal from the pressure detection portion 510. In the following description, the side of a pressure reception ring block 514 located on the left of FIG. 16 is the side of the tip of the combustion pressure sensor 508, and the side of the transmission unit 550 on the right side of the figure is the side of the back end of the combustion pressure sensor 508.

Example 5

The configurations of a combustion pressure sensor 508A according to example 5 of the second embodiment and an injector unit 506A to which the combustion pressure sensor 508A is fitted will then be described with reference to FIGS. 17 and 18.

Figure 17:
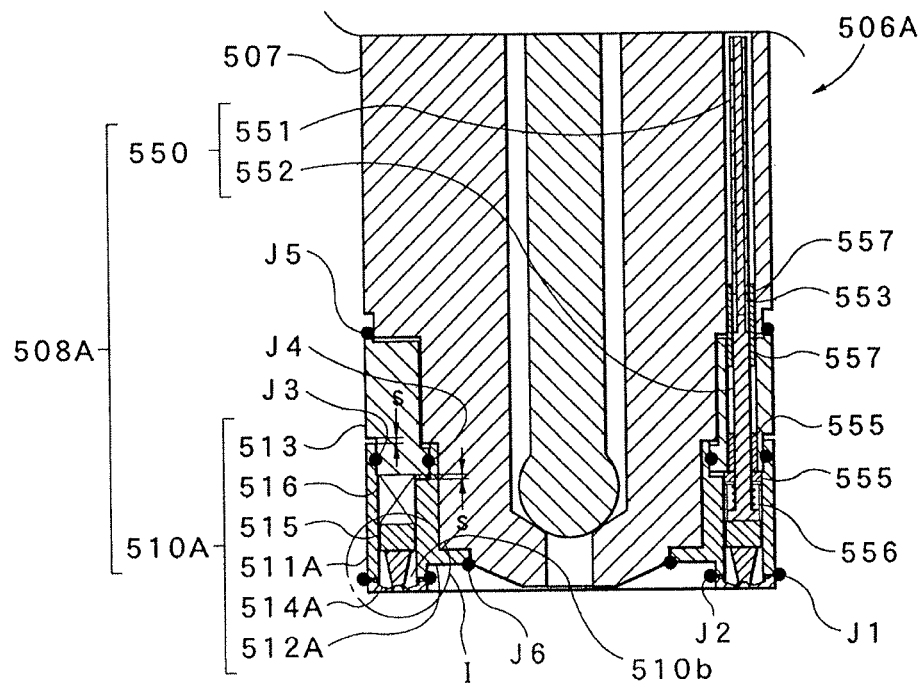
FIG. 17 is a partial cross-sectional view of a combustion pressure sensor in example 5 according to the second embodiment.
Figure 18:
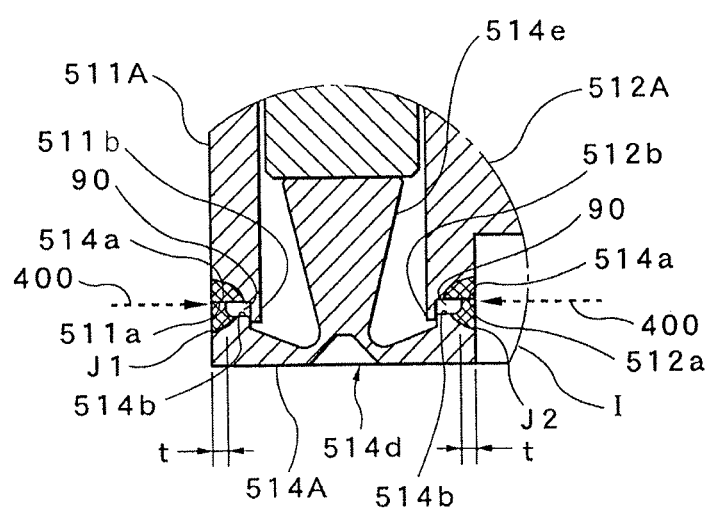
FIG. 18 is an extracted and enlarged view of an I region in FIG. 17.

FIG. 17 shows a cross-sectional view of the injector unit 506A in which the combustion pressure sensor 508A is incorporated into the injector 507, and FIG. 18 shows an enlarged view of an I region in FIG. 17.

As shown in FIG. 17, the combustion pressure sensor 508A includes a pressure detection portion 510A which has the function of detecting the pressure and the transmission unit 550 which transmits the pressure detected by the pressure detection portion 510A to outside as an electrical signal. The pressure detection portion 510A has a cylindrical shape as a whole, and in an opening portion 510a therein-side, the tip end portion of the injector 507 is stored. In this way, the tip end portion of the injector 507 penetrates the opening portion 510a of the pressure detection portion 510A from the side of the front end surface to the side of the back end surface (see FIG. 16).

In the transmission unit 550, the end portion of a connection terminal 552 on the side of the front end surface is stored within the pressure detection portion 510A, and a transmission wire 551 on the side of the back end surface is connected to the electrical connector portion 570 of the injector 507 through a guide hole for a signal wire provided in the injector 507 (see FIG. 14). Then, the back end portion of the connection terminal 552 and a conductor portion on the side of the tip end surface of the transmission wire 551 are electrically connected by swaging a connection pipe 553. The transmission unit 550 further includes a coil spring 556 which presses the connection terminal 552 to electrically connect it, a locating tube 555 which guides and insulates the connection terminal 552 and an O-ring 557 which seals the vicinity of the connection pipe 553.

On the other hand, the pressure detection portion 510A includes a front outside enclosure 511A which has a cylindrical shape, a front inside enclosure 512A which has a cylindrical shape, a rear enclosure 513 which has a cylindrical shape and a pressure reception ring block 514A which has an annular shape. In this way, after the assembly of the front outside enclosure 511A, the front inside enclosure 512A, the rear enclosure 513 and the pressure reception ring block 514A, they are coupled together through the individual welding portions, and thus the entire enclosure function in the pressure detection portion 510A is provided. Furthermore, as shown in FIG. 18, the pressure reception ring block 514A integrally forms a pressure reception portion 514d which is exposed to the side of the combustion chamber C to receive the combustion pressure from the combustion chamber and a transmission portion 514e which transmits, to a pressure transmission ring 515, a pressure (displacement) received on the side of the back surface of the pressure reception portion by the pressure reception portion 514d.

In the pressure detection portion 510A, an internal space 510b is formed which is surrounded by the front outside enclosure 511A, the front inside enclosure 512A, the rear enclosure 513 and the pressure reception ring block 514A. In the internal space 510b, the pressure transmission ring 515 which transmits the pressure from the pressure reception ring block 514A to the side of the back end surface and a piezoelectric element group which converts the pressure transmitted from the pressure transmission ring 515 into a charge signal are arranged. The piezoelectric element group is arranged on the side of the back end surface of the pressure transmission ring 515 in the circumferential direction at intervals of 60°, and includes first to sixth piezoelectric elements 516 (see FIG. 16). Furthermore, since the individual piezoelectric elements 516 . . . have the piezoelectric function of receiving the pressure to generate charges, the charges of the individual piezoelectric elements 516 . . . are added and are output. In FIG. 16, in the pressure detection portion 510A, spaces 517 . . . are arranged between the piezoelectric elements 516 . . . in the circumferential direction at intervals of 60°.

A welding method when the pressure detection portion 510A according to example 5 is manufactured will then be described with reference to FIGS. 17 and 18.

The pressure detection portion 510A welds the individual welding portions in a predetermined order with a predetermined method and fixes them, and thereby can obtain predetermined performance.

The application of a preload and a welding structure in the pressure detection portion 510A will first be described with reference to FIG. 17. In FIG. 17, the pressure reception ring block 514A is fitted to a housing unit (which is referred to as the housing unit when in the following description, the front outside enclosure 511A and the front inside enclosure 512A are treated as a unit) formed with the front outside enclosure 511A and the front inside enclosure 512A, and the joint surfaces of them are welded from the outside and the inside. In this case, the welding is performed from the outside so as to provide the welding portion J1, and the welding is performed from the inside so as to provide the welding portion J2. At the time of the welding, the housing unit formed with the front outside enclosure 511A and the front inside enclosure 512A is preferably located with a jig. In this way, it is possible to obtain a front stage portion of the enclosure of the pressure detection portion 510A.

In this case, as shown in FIG. 18, on the front end surface of the front outside enclosure 511A with a cylindrical shape, a joint surface 511a for joining the pressure reception ring block 514A is provided, and on the side of the internal space 510b, a protrusion portion 511b is provided. The outside diameter of the front inside enclosure 512A with the same cylindrical shape is smaller than the inside diameter of the front outside enclosure 511A. On the front end surface of the front inside enclosure 512A, a joint surface 512a for joining the pressure reception ring block 514A is provided, and on the side of the internal space 510b, a protrusion portion 512b is provided.

Furthermore, on the end portion of the pressure reception ring block 514A, a joint surface 514a . . . and a step portion 514b . . . are formed. In this way, when the pressure reception ring block 514A is fitted to the front outside enclosure 511A and the front inside enclosure 512A, the joint surfaces 511a and 512a of the front outside enclosure 511A and the front inside enclosure 512A make contact with the joint surface 514a . . . to the pressure reception ring block 514A. Then, the welding is performed with the welding beam 400 described previously, and thus it is possible to provide the welding portion J1 and J2. Here, since the same clearance portion 90 as in example 1 is formed by the step portion 514b . . . , the same function as in example 1 is achieved, and the protrusion portions 511b and 512b achieve the same function as the protrusion portion 31b of example 1.

On the other hand, an element unit 530 (see FIG. 16) which is previously assembled is incorporated to the front stage portion of the enclosure described previously from the side of the back end surface, and furthermore, the connection terminal 552, the coil spring 556 and the locating tube 555 are incorporated. Then, the rear enclosure 513 is finally incorporated. Thereafter, a load is applied from the side of the rear enclosure 513 to the temporarily assembled pressure detection portion 510A, a gap s (see FIG. 17) between the front outside enclosure 511A and the rear enclosure 513 is monitored and the welding is performed when the position of a predetermined distance is reached. In this case, the welding is performed from the outside so as to provide the welding portion J3, and the welding is performed from the inside so as to provide the welding portion J4. In this way, the piezoelectric elements 516 . . . are welded (fixed) in a state where a predetermined preload is applied thereto, and thus it is possible to obtain the pressure detection portion 510A shown in FIG. 17.

Then, the welding is performed on the two portions where the injector 507 and the combustion pressure sensor 508A make contact with each other, and thus as shown in FIG. 17, a welding portion J5 and a welding portion J6 are provided. The two portions also sever as a seal portion, and the combustion pressure sensor 508A and the injector make contact with each other over one circumference. The two portions are welded over the entire circumference. In this way, the portions in contact are sealed, and the combustion pressure sensor 508A and the injector 507 are integrally formed, with the result that the injector unit 506A shown in FIG. 17 is completed.

The injector 507 and the combustion pressure sensor 508A are sealed by the welding, and thus it is possible to prevent the high-pressure mixture gas and combustion gas produced within the combustion chamber C from leaking from the two welding portions into the combustion pressure sensor and to prevent the high-pressure mixture gas and combustion gas from leaking into the internal space 510b in the pressure detection portion. At the same time, it is possible to prevent the high-pressure mixture gas and combustion gas from leaking through a guide hole for a signal line formed in the injector 507 to the outside of the cylinder head 504.

An electrical connection configuration and a detection operation in the injector unit 506A will then be described with reference to FIG. 17.

As shown in FIG. 17, the end surfaces on the side of the back end surfaces of the piezoelectric elements 516 . . . are electrically connected, through an electrode on the rear side (not shown) provided therein, to a ground electrode layer (not shown) provided on the rear enclosure 513, and are grounded. On the other hand, the end surfaces on the side of the front end surfaces of the piezoelectric elements 516 . . . are electrically connected, through an electrode on the front side (not shown) provided therein, to an output electrode layer (not shown) formed on the back end surface of the pressure transmission ring 515 in the shape of a ring. The output electrode layer provided on the pressure transmission ring 515 is electrically connected to the connection terminal 552 through the abutting portion of the connection terminal 552 by the spring pressure of the coil spring 556. Furthermore, the connection terminal 552 is electrically connected from a connection portion on the side of the back end surface thereof through the connection pipe 553 to the conductor portion of the transmission wire 551.

On the other hand, a transmission path for the charge signal leading from the connection terminal 552 to the connection pipe 553 and a path leading from the conductor portion of the transmission wire 551 to the electrical connector portion 570 of the injector 507 are electrically sealed by the locating tube 555 formed with an insulator, a seal portion 557 and the resin insulating layer of the transmission wire 551 from metal portions such as the front outside enclosure 511A, the front inside enclosure 512A, the rear enclosure 513 and the injector 507. The injector unit 506A is attached to the communication hole 504a in the cylinder head 504 of the internal combustion engine 501 shown in FIG. 13, and thus the flange portion 506b provided on the outer circumferential portion of the injector 507 is fixed with a clamp (not shown), is electrically connected to the cylinder head 504 and is grounded to the automobile body.

In this way, when the internal combustion engine 501 is brought into an operated state, and thus the combustion pressure is produced in the combustion chamber C, the combustion pressure acts on the pressure reception ring block 514A welded to the tip end of the combustion pressure sensor 508A, and the action (displacement) is transmitted through the pressure transmission ring 515 to the piezoelectric elements 516 . . . , with the result that charges corresponding to the combustion pressure are produced in the piezoelectric elements 516 . . . . The charges produced in the piezoelectric elements 516 . . . are transmitted from the end surfaces on the side of the front end surfaces in the piezoelectric elements 516 . . . through the front side electrodes to the output electrode layer provided in the pressure transmission ring 515. Then, the charge signals transmitted to the output electrode layer are transmitted from the connection terminal 552 pressed thereto through the connection pipe 553 to the conductor portion of the transmission wire 551. The charge signals transmitted to the conductor portion are supplied through the electrical connector portion 570 of the injector 507 to the signal processing portion 700. Furthermore, the charge signals supplied to the signal processing portion 700 are subjected to signal processing, and a voltage corresponding to the charges is supplied to the control device 600. In this way, the control device 600 can perform predetermined control corresponding to the combustion pressure on the individual portions of the internal combustion engine including the functional components such as the injector 507 forming the injector unit 506A.

Hence, according to the combustion pressure sensor 508A based on example 5 of the second embodiment, even in the combustion pressure sensor 508A fitted to the injector 507 which is the functional component provided in the combustion chamber C, since the clearance portions 90 . . . produced by the step portion 514b . . . are provided on the joint surface where the pressure reception ring block 514A makes contact with the housing unit (the front outside enclosure 511A and the front inside enclosure 512A), the depth of welding (the welding distance t) at the time of the welding can be made constant along the circumferential direction, that is, the effective pressure reception area can be made constant. In this way, it is possible to provide the combustion pressure sensor 508A and the injector unit 506A which reduce the displacement of the sensitivity and can acquire a highly accurate pressure signal.

Since the protrusion portions 511b and 512b are provided in the position which sandwiches the clearance portions 514b (90) . . . of the housing unit (the front outside enclosure 511A and the front inside enclosure 512A) and which are opposite the welding portions J1 and J2, for example, the scattering of the weld spatters is prevented, and thus it is possible to remove a failure such as an insulation failure over the live portion within the pressure detection portion, and moreover, the scattering of the weld spatters over the contact portion between the pressure reception ring block 514A and the pressure transmission ring 515 is prevented, and thus the wear and degradation of the contact portion can be reduced, with the result that it is possible to provide the combustion pressure sensor 508A and the injector unit 506A which are highly reliable.

With consideration given to the influences of thermal inertia and the like, the intensity of the welding beam 400 such as laser is preferably set such that the depth of welding exceeds the welding distance t of the housing 31 and the pressure reception ring block 514A at least.

Example 6

A combustion pressure sensor 508B according to example 6 of the second embodiment will then be described with reference to FIGS. 19 and 20.

Figure 19:
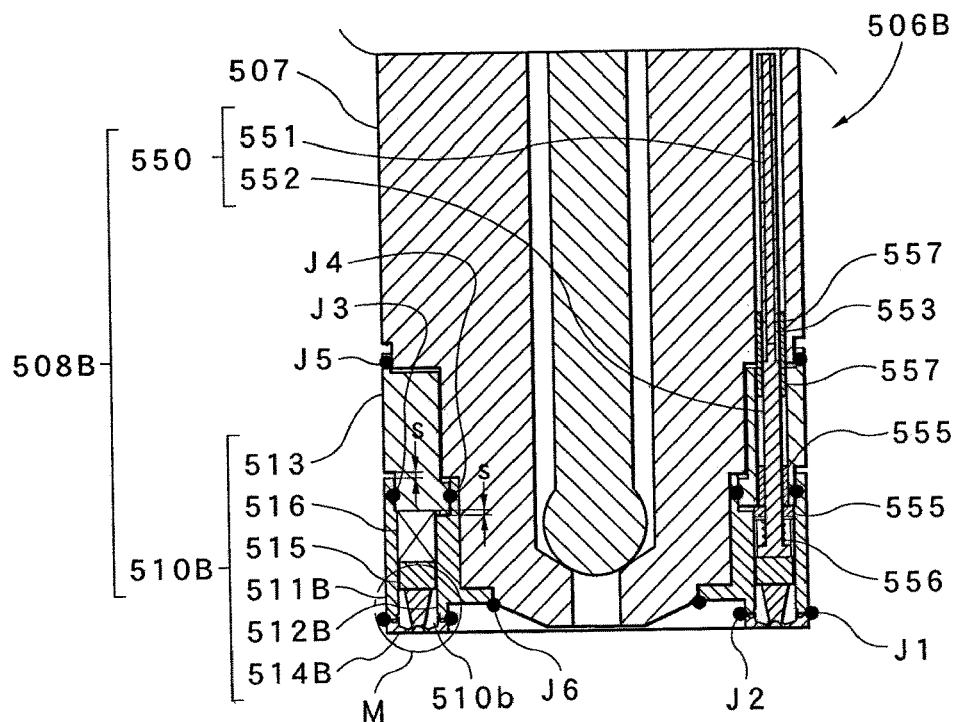
FIG. 19 is a partial cross-sectional view of a combustion pressure sensor in example 6 according to the second embodiment.
Figure 20:
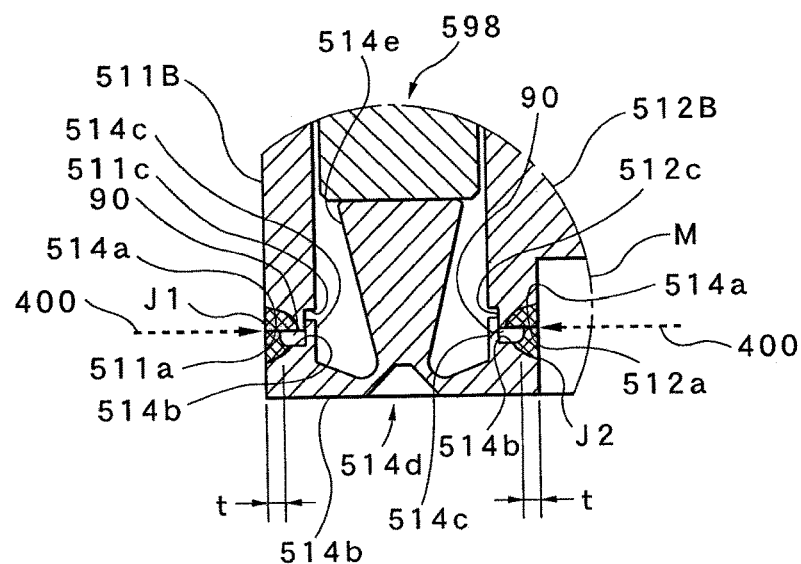
FIG. 20 is an extracted and enlarged view of an M region in FIG. 19.

FIG. 19 shows a cross-sectional view of an injector unit 506B to which the combustion pressure sensor 508B is fitted, and FIG. 20 shows an enlarged view of an M region in FIG. 19. The combustion pressure sensor 508B according to example 6 differs from the combustion pressure sensor 508A according to example 5 (FIGS. 17 and 18) in that in the combustion pressure sensor 508B, a protrusion portion 514c . . . are provided on the side of a pressure reception ring block 514B.

In other words, as shown in FIG. 20, in the joint portion of the pressure reception ring block 514B and a front outside enclosure 511B and the joint portion of the pressure reception ring block 514B and a front inside enclosure 512B, the protrusion portion 514c . . . are provided on the side of the pressure reception ring block 514b.

Hence, since in the combustion pressure sensor 508B according to example 6, the same clearance portions 90 . . . as in the combustion pressure sensor 508A according to example 5 described previously are provided, it is possible to obtain the same effects as in the combustion pressure sensor 508A according to example 5. Since the other basic configurations are the same as in example 5, the same portions and the same constituent elements are identified with the same numbers, and part of the repeated description will be omitted. The same numbers are added to the same portions and the same constituent elements, and the letter "B" of the alphabet added to the number indicates example 6. Hence, in example 5, "A" is added.

Example 7

A combustion pressure sensor 508A according to example 7 of the second embodiment will then be described with reference to FIGS. 21 and 22.

Figure 21:
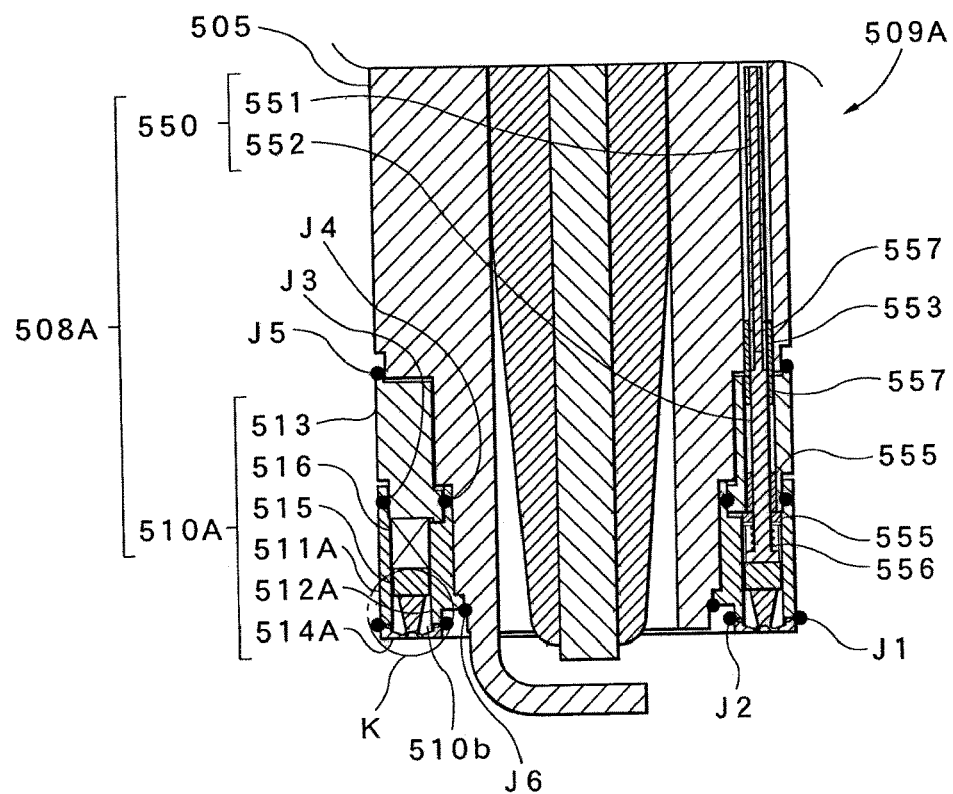
FIG. 21 is a partial cross-sectional view of a combustion pressure sensor in example 7 according to the second embodiment.
Figure 22:
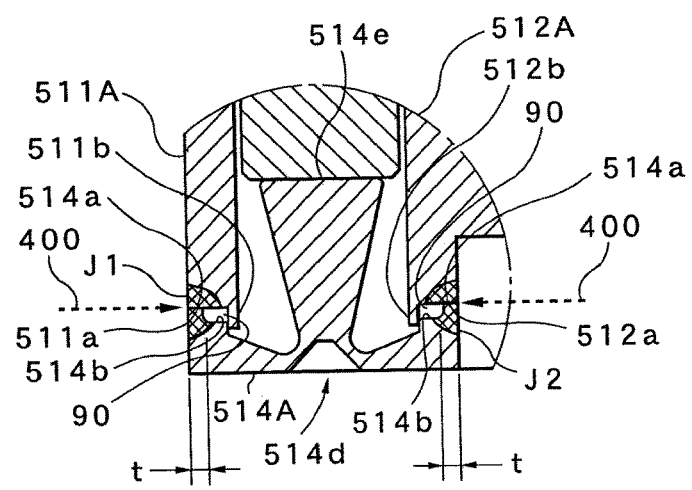
FIG. 22 is an extracted and enlarged view of a K region in FIG. 21.
Figure 23:
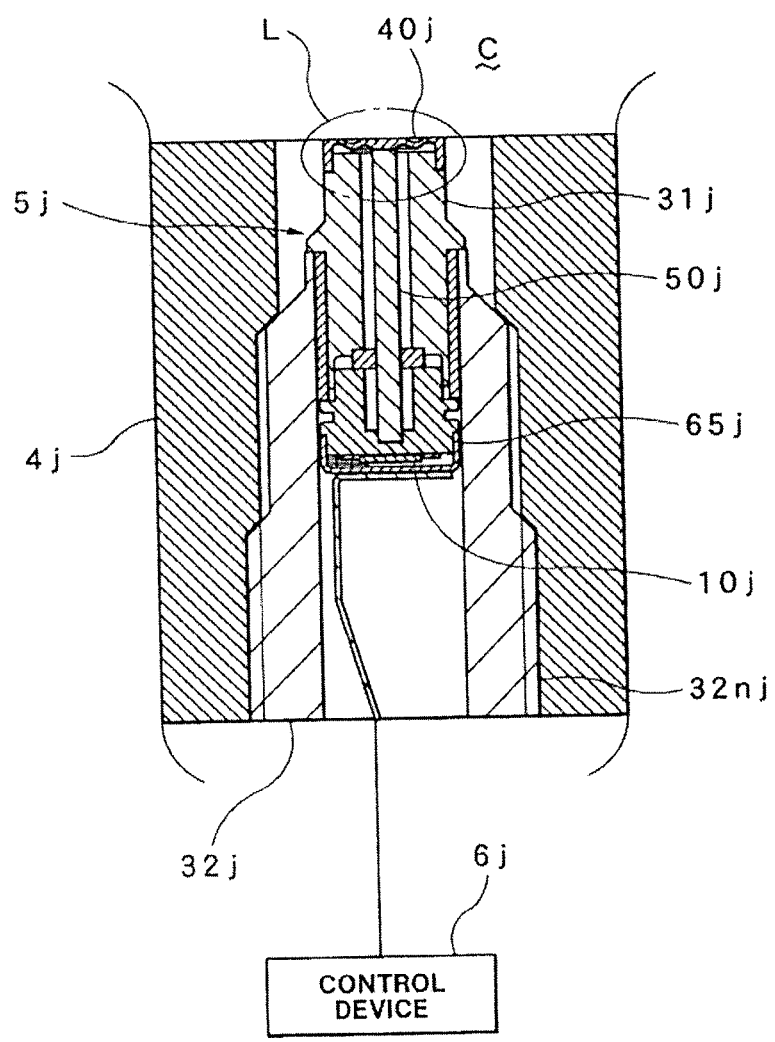
FIG. 23 is a schematic cross-sectional view showing the configuration of a pressure sensor according to a background technology.
Figure 24:
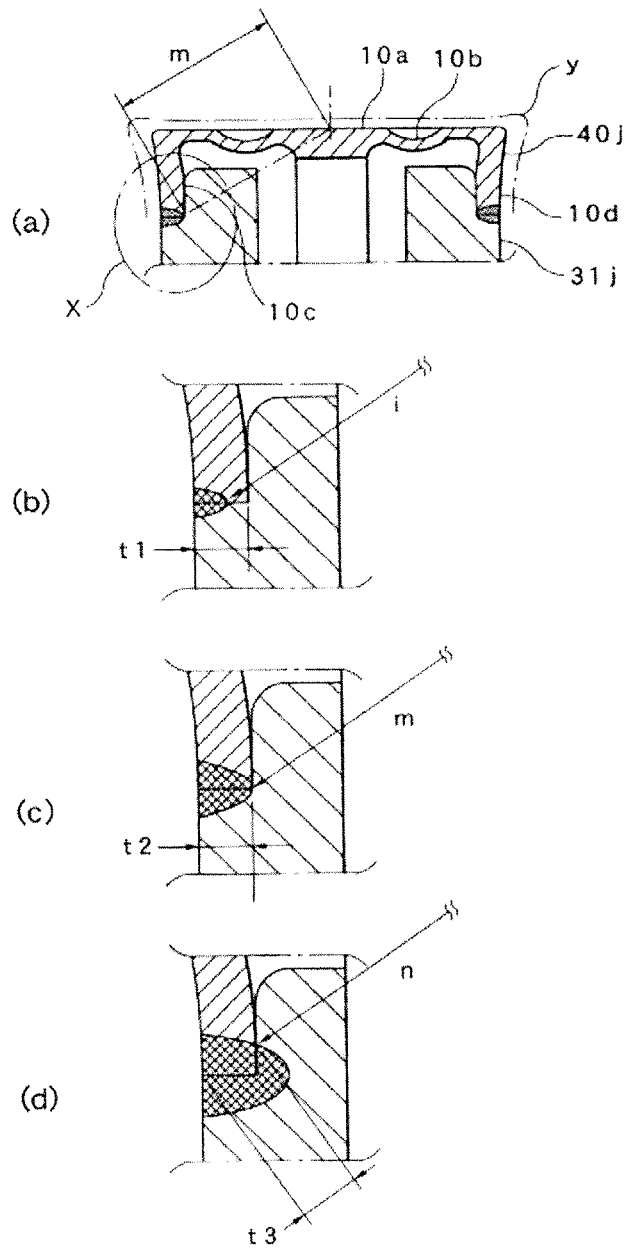
FIG. 24 is an enlarged view of an L region in FIG. 23.

FIG. 21 shows a cross-sectional view of a spark plug 505 (spark plug unit 509A) to which the combustion pressure sensor 508A is fitted, and FIG. 22 shows an enlarged view of a K region in FIG. 21. The combustion pressure sensor 508A according to example 7 differs from the combustion pressure sensor 508A according to example 5 (FIGS. 17 and 18) in that in example 7, the combustion pressure sensor 508A is provided in the spark plug 505. In other words, as shown in FIG. 21, instead of the injector 507 serving as the functional component, the spark plug 505 is used, and although the shape of the joint portion to the pressure detection portion 510A differs according to the shape of the spark plug 505, the basic configuration is the same.

Hence, since in the combustion pressure sensor 508A according to example 7, the same clearance portions 90 . . . as in the combustion pressure sensor 508A according to example 5 described previously are provided, even when the target to which the combustion pressure sensor 508A is fitted differs, it is possible to obtain the same effects as in the combustion pressure sensor 508A according to example 5. Since the other basic configurations are the same as in example 5, the same portions and the same constituent elements are identified with the same numbers, and part of the repeated description will be omitted.

Although in the second embodiment (examples 5 to 7), the combustion pressure sensors 508A and 508B are respectively fitted to the injector 507 and the spark plug 506, and thus the injector unit 506A and the spark plug unit 509A are formed, even when the combustion pressure sensor 508A . . . are fitted to various functional components such as a glow plug, the same clearance portions 90 . . . are provided, and thus it is possible to perform the same operation. The protrusion portions 511b and 512b may be provided on the side of the pressure reception ring block 514A.

Although the first embodiment (examples 1 to 4) and the second embodiment (examples 5 to 7) are described in detail above, the present invention is not limited to such embodiments, and modifications, additions and deletions can be arbitrarily performed on the detailed configurations, the shapes, the materials, the numbers, the methods and the like without departing from the spirit of the present invention.

For example, although the case where the clearance portions (90 . . . ) are provided by the step portions (41b) which are formed on at least either of the pressure reception members (40 . . . ) and the case members (31 . . . ) is illustrated, the cross-sectional shape of the step portions (41b . . . ) is not limited to the examples, and as long as the actions and effects according to the present invention are achieved, various types of shapes such as a rectangular shape including a trapezoid, an arc shape and a triangular shape can be applied. Likewise, as long as the actions and effects according to the present invention are achieved, various types of forms can be applied to the shape and the size of the protrusion portions (31b . . . ). In terms of ensuring welding quality, the same applications can be performed not only to the welding of the pressure reception members (40 . . . ) and the case members (31 . . . ) but also to the other welding portions J1 to J6, and in terms of broad technical ideas, they are conceptions which are included in the present invention. Although the example where as the welding method, the laser welding method is used is described, as long as the present invention can be realized, various other types of welding methods can be utilized.

INDUSTRIAL APPLICABILITY

The combustion pressure sensor according to the present invention and the manufacturing method thereof can be widely utilized for applications in which various combustion pressures such as a combustion pressure in an internal combustion engine are detected. The combustion pressure sensor may be singly utilized or various functional components such as an injector, a spark plug and a glow plug to which the combustion pressure sensor is fitted may be utilized.

The invention claimed is:

1. A combustion pressure sensor comprising:
   a case member having an outer surface, an inner surface and a first joint surface on a side of a tip end and having an opening portion;
   a pressure reception member on which a combustion pressure acts, the pressure reception member having a main surface, a depending flange extending from the main surface, the depending flange having an inner surface, an outer surface and a second joint surface;
   a welding portion in which the first joint surface and the second joint surface are joined to each other;
   a piezoelectric element which is stored in the case member and converts a pressing force based on the combustion pressure transmitted from the pressure reception member into a signal;
   a clearance portion provided so as to form a gap between the first joint surface and the second joint surface; and
   a projection extending from the first joint surface, the projection having a proximal end connected to the case member and a distal end spaced from the proximal end, an outer surface of the projection forming a bottom of the clearance portion and contacting the inner surface of the flange, the outer surface of the projection having a constant diameter,
   wherein the welding portion is wider than the clearance portion so as to contact a top surface and side surfaces of the clearance portion, and
   wherein the clearance portion is located between the welding portion and the projection.

2. The combustion pressure sensor according to claim 1, wherein the pressure reception member is a diaphragm on which the combustion pressure acts, and
   the case member is a cylindrical housing which includes the first joint surface joined to the second joint surface along an outer circumference of the diaphragm.

3. The combustion pressure sensor according to claim 1, wherein the combustion pressure sensor is integrally formed with a functional component which is provided in an internal combustion engine.

4. The combustion pressure sensor according to claim 3, wherein as the pressure reception member, a pressure reception ring block on which the combustion pressure acts is used, and
 as the case member, a cylindrical outside enclosure which has a joint surface joined to a joint surface along an outer circumference of the pressure reception ring block and a cylindrical inside enclosure which has a joint surface joined to a joint surface along an inner circumference of the pressure reception ring block are used.

5. The combustion pressure sensor according to claim 3, wherein an injector, a spark plug or a grow plug is applied to the functional component.

6. The combustion pressure sensor according to claim 5, wherein as the pressure reception member, a pressure reception ring block on which the combustion pressure acts is used, and
 as the case member, a cylindrical outside enclosure which has a joint surface joined to a joint surface along an outer circumference of the pressure reception ring block and a cylindrical inside enclosure which has a joint surface joined to a joint surface along an inner circumference of the pressure reception ring block are used.

7. The combustion pressure sensor according to claim 1, wherein as the pressure reception member, a pressure reception ring block on which the combustion pressure acts is used, and
 as the case member, a cylindrical outside enclosure which has a joint surface joined to a joint surface along an outer circumference of the pressure reception ring block and a cylindrical inside enclosure which has a joint surface joined to a joint surface along an inner circumference of the pressure reception ring block are used.

8. The combustion pressure sensor according to claim 1, further comprising a first groove formed in the second joint surface, the first groove extending to the inner surface of the flange, the first groove forming the clearance portion.

9. The combustion pressure sensor according to claim 8, further comprising a second groove formed in the first joint surface, the second groove extending to the projection and combining with the first groove in the second joint surface to form the clearance portion.

10. A method of manufacturing a combustion pressure sensor, the method comprising:
 bringing a first joint surface provided in a pressure reception member on which a combustion pressure acts into planar contact with a second joint surface provided in an opening portion on a side of a tip end of a case member, the pressure reception member having a main surface, a depending flange extending from the main surface, the depending flange having an inner surface, an outer surface and the second joint surface;
 welding the joint surfaces to each other through a welding portion so as to block the opening portion;
 storing, in the case member, a piezoelectric element which converts a pressing force based on the combustion pressure transmitted from the pressure reception member into a signal and outputs the signal,
 extending a projection from the second joint surface, the projection having a proximal end connected to the case member and a distal end spaced from the proximal end, an outer surface of the projection contacting the inner surface of the flange, the outer surface of the projection having a constant diameter; and
 forming a clearance portion between the welding portion and the projection to form a gap between the first joint surface and the second joint surface, the outer surface of the projection forming a bottom of the clearance portion,
 wherein the welding portion is wider than the clearance portion so as to contact a top surface and side surfaces of the clearance portion.

11. The method of manufacturing a combustion pressure sensor according to claim 10, wherein a welding beam based on a laser welding method is used for the welding.

12. The method of manufacturing a combustion pressure sensor according to claim 11, wherein an intensity of the welding beam is set such that at least a depth of the welding portion exceeds the depth of welding which is set.

* * * * *